United States Patent [19]

Schwartz

[11] 4,072,600

[45] Feb. 7, 1978

[54] CATALYTIC CRACKING PROCESS

[75] Inventor: Albert B. Schwartz, Philadelphia, Pa.

[73] Assignee: Mobil Oil Corporation, New York, N.Y.

[21] Appl. No.: 649,261

[22] Filed: Jan. 15, 1976

Related U.S. Application Data

[63] Continuation-in-part of Ser. No. 440,890, Feb. 8, 1974, abandoned, and Ser. No. 599,920, July 28, 1975, abandoned, each is a continuation-in-part of Ser. No. 399,008, Sept. 20, 1973, abandoned.

[51] Int. Cl.² .......................... C10G 11/04; B01J 8/24
[52] U.S. Cl. ..................................... 208/120; 208/113; 208/121; 208/164; 252/416; 252/417
[58] Field of Search ................. 208/120, DIG. 1, 121, 208/124; 252/417, 416

[56] References Cited

U.S. PATENT DOCUMENTS

| | | | |
|---|---|---|---|
| 2,436,927 | 3/1948 | Kassel | 252/417 |
| 3,364,136 | 1/1968 | Chen et al. | 208/120 |
| 3,554,900 | 1/1971 | Bowes | 208/111 |
| 3,629,097 | 12/1971 | Smith | 208/159 |
| 3,649,522 | 3/1972 | Martin | 208/120 |
| 3,650,990 | 3/1972 | Frilette et al. | 252/455 Z |
| 3,696,025 | 10/1972 | Chessmore et al. | 208/113 |
| 3,788,977 | 1/1974 | Dolbear et al. | 208/120 |
| 3,849,291 | 11/1974 | Owen | 208/78 |
| 3,909,392 | 9/1975 | Horecky et al. | 208/120 |
| 3,926,778 | 12/1975 | Owen et al. | 208/74 |

FOREIGN PATENT DOCUMENTS

| | | | |
|---|---|---|---|
| 1,178,594 | 1/1970 | United Kingdom | 208/120 |

*Primary Examiner*—Delbert E. Gantz
*Assistant Examiner*—G. E. Schmitkons

[57] ABSTRACT

A catalytic process for cracking of gas oil is disclosed, wherein trace amounts of metals of Periods 5 and 6 of Group VIII or rhenium is added to the total catalyst inventory so as to enhance significant conversion of the CO in the regenerator while maintaining the efficiency of the cracking reaction at high levels.

3 Claims, 6 Drawing Figures

U.S. Patent  Feb. 7, 1978  Sheet 1 of 4  4,072,600
Figure 1
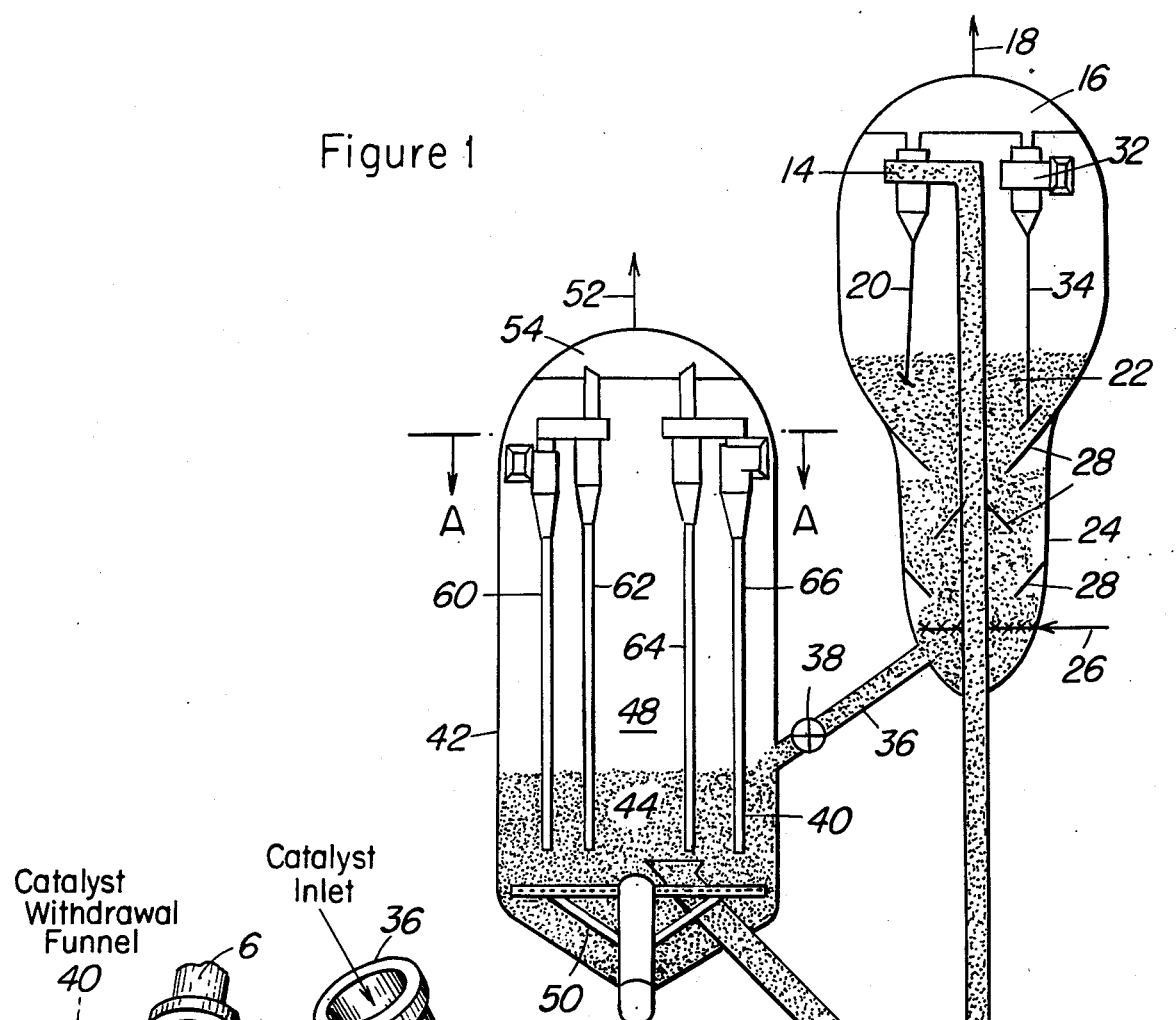
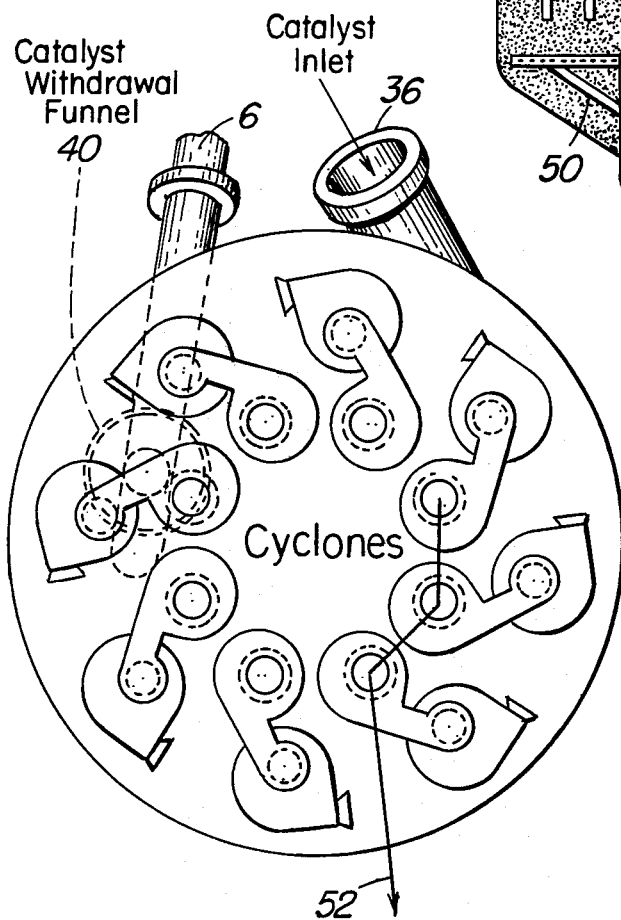
Figure 2

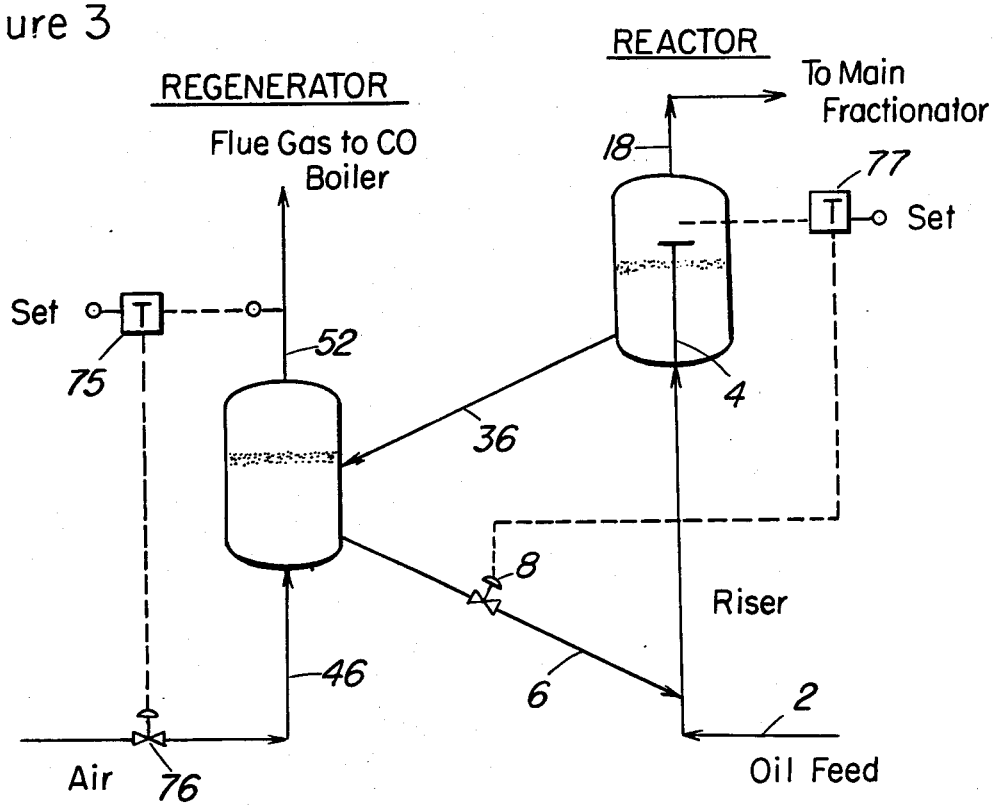
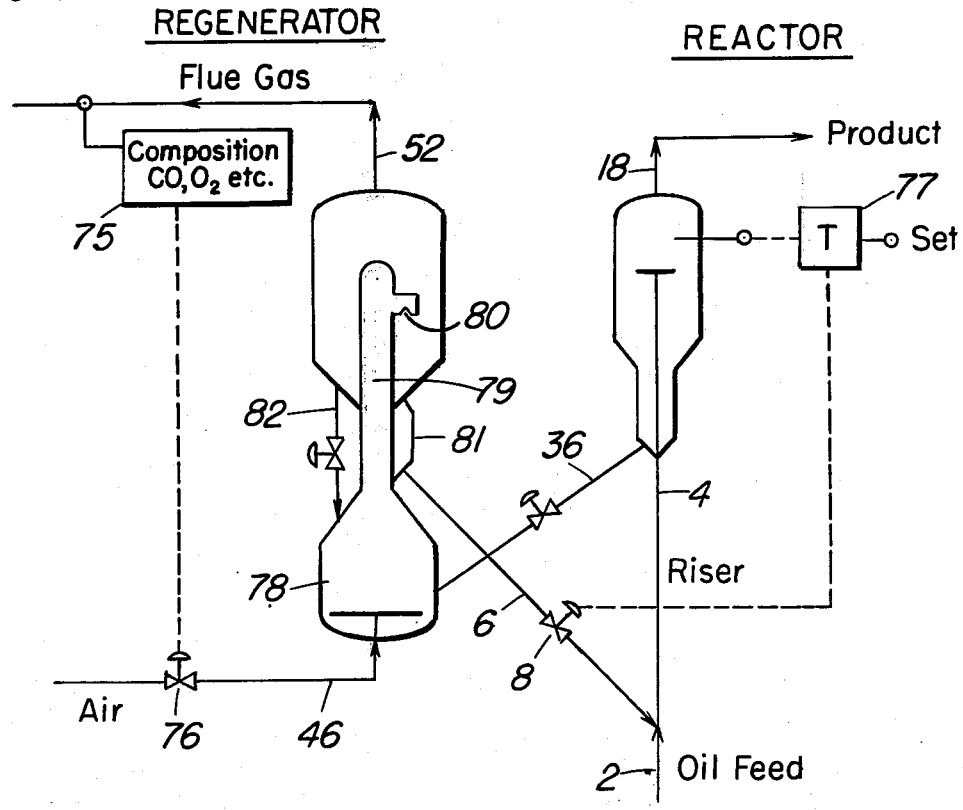

TYPICAL EFFECT of $CO_2/CO$ RATIO on FCC PERFORMANCE

CATALYTIC CRACKING PROCESS

CROSS REFERENCE TO OTHER APPLICATIONS

This application is a continuation-in-part of Application Ser. No. 440,890, filed Feb. 8, 1974 now abandoned and Ser. No. 599,920, filed July 28, 1975. Applications Ser. No. 440,890 and Ser. No. 599,920 are continuations-in-part of Ser. No. 399,008, filed Sept. 20, 1973, now abandoned.

BACKGROUND OF THE INVENTION

In the commercial cracking of gas oils to produce hydrocarbons boiling in the motor fuel range, there are a wide variety of reactions which take place, some of which are desirable, and some of which are undesirable. It is believed that the refiner today strikes a compromise between the desirable reactions and the undesirable reactions which are taking place, and the basis of such compromise varies from situation to situation and from refiner to refiner. It is simple to state that a refiner desires to make the maximum amount of desirable products, and yet to accomplish this in an economically favorable manner. However, when the above simple statement is buttressed against economic reality, compromises must be made. Thus, for example, a process which yields the maximum amount of gasoline from a barrel of crude oil is not necessarily the most economically attractive one at any given location, for the simple reason that such a process might theoretically require a catalyst which must be subjected to more frequent regenerations, or said hypothetical process might simply bear too heavy an economic penalty as compared to a process which produces slightly less gasoline from a given barrel of crude, but at cheaper cost. Thus, the typical refiner of today is constantly compromising between the most effective theoretical manner of carrying out a desired reaction and the practicality of such theoretically desired reaction based on such ever-changing factors as the nature and type of the crude being used, the particular market value of the various products which can be obtained from the crude, the cost and nature of the catalyst which is being used, the availability and constraints caused by existing equipment, and quite recently, by restraints imposed by the Environmental Protection Agency with respect to certain emission standards. It also appears quite obvious that these various compromises will become even more troublesome in the future due to the dependency upon foreign crude and the fact that the most desirable feed for a particular operation may not be available or may be available at too high a cost, such that careful balance must be struck betwen obtaining the maximum amount of useful products from a barrel of crude so as to minimize our dependency upon foreign crude and accomplishing the same as to optimize the economic aspects of the operation and comply with the various regulations with respect to pollution primarily with respect to the nature and extent of contaminants which are released to the atmosphere.

COMMERCIAL CRACKING PROCESSES

In general, commercial operations with regard to the cracking of gas oils can be placed into two broad categories which are commonly referred to in the art as "cracking" and "hydrocracking". Both these processes have been well defined in the art together with the various reasons why one is preferable over the other in a given situation. It is not the purpose of this invention to discuss the relative merits of cracking and hydrocracking. However, it is important to note that hydrocracking requires the presence of a hydrogenation/dehydrogenation component in a mixture with a cracking catalyst in order for it to function, whereas catalytic cracking does not. In fact, it is well known in the art that the presence of a hydrogenation/dehydrogenation component in a cracking process is detrimental to said process. Thus one of the major advantages of hydrocracking is that because of the presence of a hydrogenation/dehydrogenation component a very small amount of coke is deposited on the catalyst such that the catalyst remains active for prolonged periods of time and does not require regeneration except at long intervals. On the other hand, catalytic cracking inherently results in the deposition of significant coke on a catalyst thereby resulting in a decline of activity of said catalyst which must be compensated for by frequent regeneration of the same by burning off the coke at elevated temperatures in a regenerator. it is also well known in the art that if a hydrogenation/dehydrogenation component is present in a cracking operation that undesirable increases in coke and hydrogen will result. Thus, the very material or substance which when employed in a hydrocracking operation effectively controls and minimizes the amount of coke which is formed (i.e., the H/D component accomplishes the reverse result in a cracking reaction. At first blush, this would appear to be contradictory until it is remembered that conditions employed in a hydrocracker are drastically different than the conditions which are employed in a commercial cracking unit. The reason why a hydrogenation component is desirable and necessary in a hydrocracking operation is that such is carried out at conditions wherein the thermodynamics of the system favor desirable reactions. Thus, by way of considerable over-simplification, hydrocracking is carried out at conditions such that the hydrogenation component is made to work to produce desirable reactions. On the other hand, a commercial catalytic cracker involves conditions, such that if a hydrogenation component was present the action of the hydrogenation component favors the undesirable reactions, which results in the production of increased coke and increased hydrogen.

If one were to merely consider a catalytic cracking operation from the point of view of theory only, it can well be stated that the presence of a hydrogenation component would be completely undesirable and something to be avoided since the economic penalty posed by increased coke and increased hydrogen production is too high a premium to pay for any conceivable advantage which might be gained by changing the product distribution.

However, it should be immediately realized that it is not possible to consider the cracking reaction only since every commercial cracker has a regenerator, wherein the coked catalyst is contacted with a oxygen-containing gas in order to decrease the coke and restore its activity. The regenerating side and the cracking side must be considered together since what happens on the cracking side affects what happens in the regenerating side, and conversely what happens in the regenerator side affects what happens during the cracking cycle.

Heretofore, there has been attention devoted by workers in the art to control the regeneration of a cracking catalyst, and in general it can fairly well be stated that the problem that most frequently occupied workers in the art was to reduce the carbon contamination of the catalyst by combustion of the same without affecting the physical properties of the catalyst. Thus, for example it has long been recognized that certain cracking catalysts, if exposed to extremely high temperatures, become damaged and suffer an irretrievable loss of activity and/or selectivity. Additionally, as it is well recognized in the art, the cracking reaction is an endothermic one and requires heat in order to cause it to take place, and a substantial portion of heat necessary to drive the cracking reaction forward is provided by the heat which is generated by burning off the coke of the contaminated catalyst in the regenerator. In the early developments of the regenerator, the primary consideration was the restoration of the catalyst activity by the removal of coke together with the utilization of heat generated by introduction of hot catalyst into cracking reaction. Additionally, the workers of the art fully appreciated that temperatures in the regenerator should not get so high that the catalyst would become physically damaged.

The art also appreciated that the removal of coke from a catalyst in the presence of oxygen results in the formation of carbon monoxide and carbon dioxide. Further, the art also appreciated that carbon monoxide could itself be further oxidized to carbon dioxide. All these reactions involve the liberation of heat. A problem which developed fairly early in the art particularly with respect to TCC type units was that too much carbon monoxide was present in admixture with oxygen in the regenerator in the effluent gas disengaging devices and in the exhaust ducts, such that the carbon monoxide ignited, thereby liberating additional heat which caused damage not only to the equipment, but also the catalyst. This phenomena was referred to in the art as "afterburning".

Prior art workers approached the problem of controlling afterburning by limiting the temperature by steam injection or by limiting the amount of carbon monoxide in contact with oxygen, such that the oxidation of carbon monoxide to carbon dioxide could not take place. Steam injection in this manner accelerated catalyst deactivation. One very common term employed by most all workers in the prior art was "$CO_2/CO$ ratio". Thus, if the $CO_2/CO$ ratio could be raised, quite obviously, there would be less carbon monoxide present which could react with the excess oxygen thereby eliminating the problem of afterburning. In fact, there have been many traditional approaches along this line, and they all involved the addition of an oxidation component to a cracking-catalyst, the theory being that the oxidation catalyst would catalyze the reaction of carbon monoxide to carbon dioxide, thereby avoiding the problem of afterburning. In fact, a commercial catalyst utilizing chromium oxide to accomplish this purpose was developed and is disclosed in U.S. Pat. No. 2,647,860.

It should be apparent that the vast majority, if not all, of the solid oxidation catalysts are also hydrogenation/dehydrogenation catalysts. As has heretofore been pointed out, it is not desirable to have a hydrogenation/dehydrogenation catalyst in a cracking reactor since said material leads to excessive coke and hydrogen formation.

The prior art catalyst represented a compromise between the oxidation function which was desirable, and the hydrogenation/dehydrogenation function which was undesirable.

It should be immediately pointed out that under the goals which existed at the time these prior catalysts were used, they were successful. It is a fact that chromium oxide catalysts did control the $CO_2/CO$ ratio without economically prohibitively affecting the cracking reaction when it is remembered that what was meant by control of the $CO_2/CO$ ratio at that time is not what is meant at the present time. As has been stated, the prior art workers were only concerned with minimizing the problem with afterburning, and such problem is effectively removed when the $CO_2/CO$ ratio is just slightly affected. Thus, chromium oxide catalyst is indeed effective in some cases to alter the $CO_2/CO$ ratio to the point where afterburning does not take place without seriously affecting the cracking reaction. Somewhat the same thing can be said with respect to titanium as is set forth in U.S. Pat. No. 3,696,025, i.e., that titanium would enhance or control the $CO_2/CO$ ratio without substantially affecting the cracking reaction if it is remembered that such statement is valid only in the context in which it is made, i.e., there is a limited change in the $CO_2/CO$ ratio. Thus, for example, in U.S. Pat. No. 3,696,025 the $CO_2/CO$ ratio is changed from 1.4 to about 2.2.

In recent years a need has arisen to control the $CO_2/CO$ ratio, which has absolutely nothing whatsoever to do with the problem of afterburning, but rather is directly related to Environmental Regulations enacted by the Federal and/or State Governments concerning emission standards. Thus, there are now regulations which limit the amount of carbon monoxide which can be discharged to the atmosphere and such limitations must be complied with irrespective of whether or not the achievement or attainment of such levels is beneficial or detrimental to the cracking reaction. There have been many proposals made to meet the problem of Emission Standards, the most common one being the provision of a CO boiler, wherein the effluent gas from the regenerator containing the CO is fed to a separate boiler where the CO is burned to $CO_2$ in order to meet Emission Standards. Quite obviously these boilers represent a large additional capital expenditure, and provisions must be made for recovering the heat values integrating them in the overall refinery operation. It is to be pointed out that in order to meet the Emission Standards, the inherently resulting $CO_2/CO$ ratios are nowhere near the ratios comtemplated by the prior art. In other words, the amount of carbon monoxide which much be oxidized to carbon dioxide in order to meet Emission Standards is of much greater magnitude than that which was necessary to control afterburning. The problems encountered in meeting Emission Standards and in controlling the afterburning, though similar, are completely and totally unrelated.

More importantly, the prior art catalysts which had been used to control $CO_2/CO$ ratios with respect to afterburning phenomena were already operating at the extreme end of economic practicality, with respect to the enhanced gas make and coke make which they were providing, and yet it was now necessary to convert even more CO to $CO_2$ in order to meet environmental regulations. Quite obviously, the catalysts of the prior art simply cannot affect even more drastic reduction of carbon monoxide without affecting the cracking reaction. Although not wishing to be bound by any theory of operation, the reason is believed to be the fact that the oxidation function of these catalysts is so sufficiently close to the hydrogenation/dehydrogenation activity of these catalysts that any increase in the amount of catalyst in order to enhance the oxidation function will automatically increase the hydrogenation/dehydrogenation function, thereby resulting in a tremendous economic imbalance.

SUMMARY OF THE INVENTION

It has now been found that the use of a metal or combination of metals of periods 5 and 6 from group VIII of Period Table or rhenium permit an effective control of carbon monoxide from the effluent gas of the regenerator while still maintaining excellent gasoline yield without excessive coke and hydrogen make.

For reasons which are not at all understood, it has been discovered that quite surprisingly, the above-referred to metals can be introduced into a cracking operation in extremely minute quantities such that they will retain their oxidation function and, yet, have their hydrogenation/dehydrogenation function sufficiently reduced such that they have become an effective tool in the control of carbon monoxide emissions from a commercial cracker.

It should become immediately apparent that the metals of this invention have long been recognized to be very powerful oxidizing agents and hydrogenation/dehydrogenation agents such that it is totally unexpected that it would be possible to reach a point where the oxidation activity of these catalysts would remain at an extremely high level, whereas the hydrogenation/dehydrogenation action could be effectively reduced by the simple expedient of controlling the concentration of these metals in a cracking reaction. There is simply no reason to expect that it would be possible to selectively maintain the oxidation function of these catalysts. Again, while not wishing to be bound by any theory of operation, nevertheless, it appears that the catalysts of this invention are unique in accomplishing their intended purpose, since it is the only group of catalysts which shown this great differential between their oxidizing function and their hydrogenation/dehydrogenation function and said differential remains throughout the range of concentrations contemplated in this invention.

Thus, for example, nickel has long been known to be a powerful oxidizing agent and a powerful hydrogenation/dehydrogenation agent. However, nickel has long been recognized as being extremely detrimental to a cracking reaction, and, in fact, there are many commercial operations existing today which are designed and operated so as to remove nickel from the system when it builds up beyond certain extremely minute levels (e.g. by withdrawing a portion of the contaminated catalyst.) Experiments which have been carried out indicate that it is not possible to use nickel alone in this invention, and perhaps an explanation would be the fact that there is no great difference between the hydrogenation/dehydrogenation activity of nickel and its oxidation activity for any given concentration.

Thus, by way of considerable over-simplification, it has been found that although nickel does indeed possess a dehydrogenation function and an oxidation function, these two functions are not so widely separated that it is possible to accentuate one and depress the other by controlling the concentration of nickel. Thus, although it is possible to reduce the dehydrogenation activity of nickel by controlling its concentration, yet what also happens is that the oxidation function of nickel is also reduced and there does not reach a point where it is possible to have sufficient oxidation of carbon monoxide to carbon dioxide and yet substantially uneffect the cracking reaction.

There is also a vast difference between the catalysts of this invention and the chromium oxide catalyst most commonly employed in the prior art. Chromium oxide has a relatively weak hydrogenation/dehydrogenation activity. However, more importantly there is not this differential between the two activities such that if one were to increase the concentration of chromium oxide to the point where there would be sufficient catalyst present to effectively catalyze increased amounts of CO to $CO_2$ there would be a corresponding increase in the dehydrogenation/hydrogenation function, which would result in increased coke and gas make.

Thus, reference to heretofore mentioned U.S. Pat. No. 2,647,860 directed towards the use of chromium oxide to control afterburning will show that the maximum permissible chromium oxide content recited in this patent for controlling afterburning is about 1% by weight of the dry catalyst. The patent discloses that at levels above 1%, excessive coke formation becomes an important factor.

According to this invention, carbon monoxide is oxidized to $CO_2$ in the oxidizing atmosphere of a catalytic cracking regenerator at levels of oxidation catalyst which produce in the reactor perturbations of the reaction which are quite tolerable, in the sense that the variations in hydrogen make and coke yield are significantly less than heretofore. In some cases, normal variants of these values due to fluctuations with nature of charge stock and operating conditions are at least as great as those due to the present catalyst. Such variations may be accommodated by the design of commercial units and hence the effects of the present catalyst on the cracking side of the cycle are minimized.

The invention involves catalyst-transfer catalytic cracking processes in which cracking is carried out in one or more zones of the unit and the catalyst is transferred continuously from these zones to one or more other zones of the unit where the coke deposit from the cracking reaction is burned off and the catalyst is transferred back to the cracking zones. The catalyst is a porous, acidic solid of high surface area, such as activated clays, cogels of silica-alumina, silica-thoria, silica-zirconia, silica-alumina-zirconia, silica-magnesia and the like, all as well known to the prior art; but modified by incorporation of at least one metal from periods 5 and 6 of Group VIII or rhenium in an amount to induce oxidation of CO but insufficient to cause dehydrogenation of aliphatic compounds at catalytic cracking conditions of temperature in excess of 800° F. and pressure not higher than 50 pounds per square inch, gauge to such a degree that the hydrogen and coke make becomes excessive. The processes according to the invention are conducted without added hydrogen and yet the catalyst remains active and effective. Preferably the catalyst incorporates an active crystalline aluminosilicate zeolite greater than 6 Angstrom Units, such as rare earth exchanged synthetic faujasite.

BRIEF DESCRIPTION OF THE DRAWINGS

FIG. 1 exemplifies a fluid catalytic cracking apparatus.

FIG. 2 exemplifies the cyclone combinations diagramatically illustrated in FIG. 1.

FIG. 3 exemplifies control loops responsive to flue gas temperature and reactor top temperature.

FIG. 4 exemplifies control loops for a fluid catalytic cracking unit designed for complete combustion of CO.

DESCRIPTION OF PREFERRED EMBODIMENTS

Figure 5:
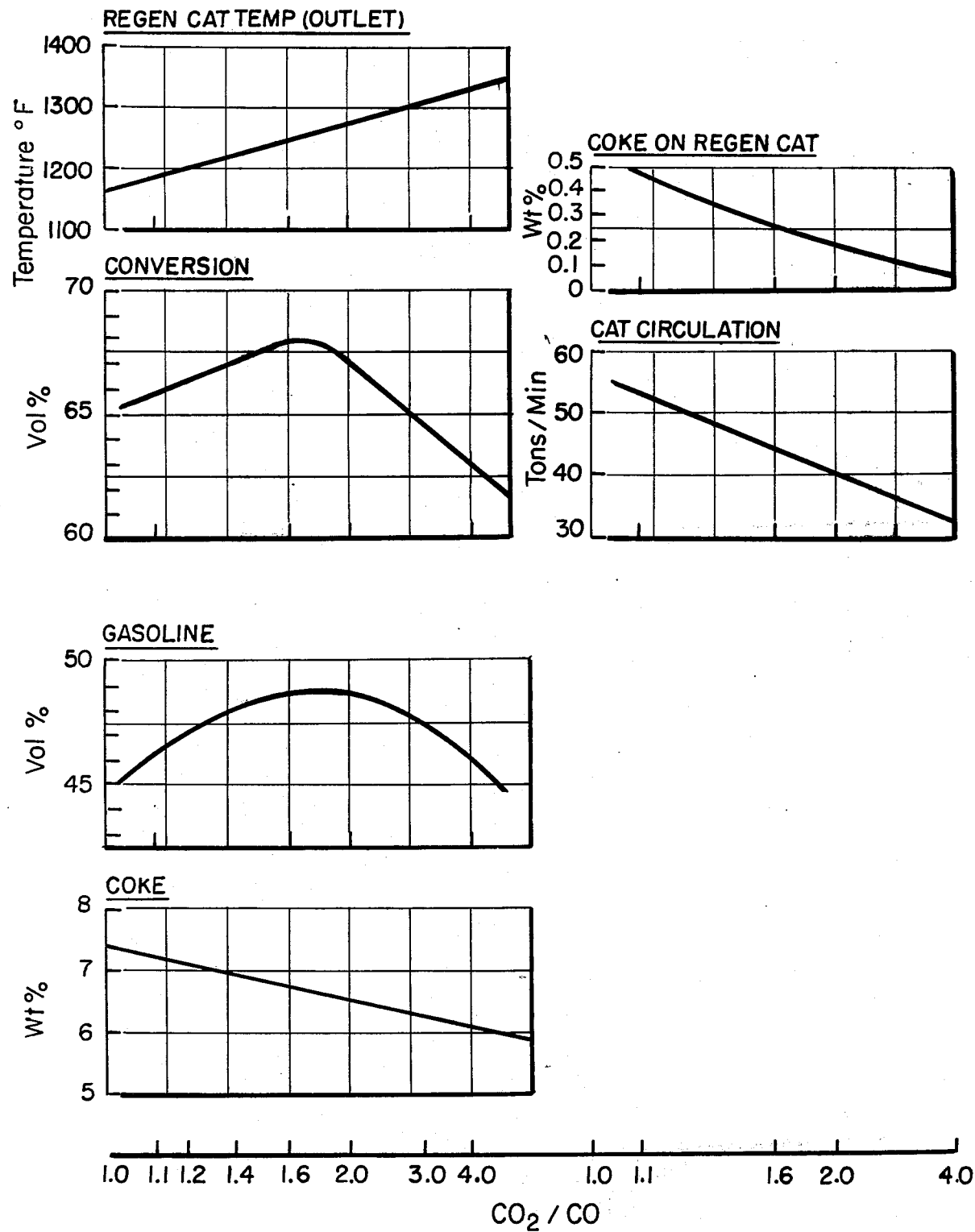
FIG. 5 shows a typical effect of $CO_2/CO$ ratio on fluid catalytic cracking performance.

In a typical embodiment, the invention is applied for improvement in operation of an FCC type system having riser, fluidized bed or other type of reactor and a regenerator in which there is maintained a dense bed of catalyst fluidized by air with a dilute catalyst phase thereabove. In one type of reactor design, the spent catalyst from the reactor is introduced tangentially to the dense bed of catalyst which is fluidized by regeneration air introduced by a grid below th dense bed. The tangential introduction of spent catalyst induces a swirl in the dense bed whereby the catalyst under regeneration moves in a generally circular path to a discharge port below the dense bed approximately 270° from the catalyst introduction port. A portion of the hot catalyst continues in the swirling pattern to mingle with and aid in ignition of newly added spent catalyst.

The gasses passing through and rising from the dense bed carry with them a portion of catalyst entrained from the dense bed, thus producing a dilute phase of suspended catalyst above the dense bed. The dilute phase passes to cyclone separators at the top of the regenerator vessel where catalyst is removed and drops through dip legs back to the dense bed, the effluent regeneration gas then passing to stock for discharge to atmosphere, usually after recovery of heat values and burning of CO, if necessary.

Carbon monoxide generated in the dense bed by reaction of coke and an oxygen-containing gas will react with excess air in the dilute phase, generating heat. Because of the low catalyst mass in the dilute phase, the temperature in the dilute phase rises substantially, often enough to damage the catalyst present in the dilute phase and subject cyclones to temperatures in excess of that tolerable by the metals used. This increase in temperature above the dense bed is an important parameter in FCC operation. It is commonly reported as the temperature differential ($\Delta T$) between temperatures detected by thermocouples in the dense bed and in the dilute phase.

The present invention contemplates a modified cracking catalyst capable of inducing combustion of CO in the dense bed where the released heat can be accepted by the large mass of catalyst as sensible heat available for supply of heat of reaction in the cracking reactor. That result is accomplished by supply to the catalyst inventory; defined as total catalyst in the operating unit including reactor, regenerator, transfer lines, stripping zones, etc.; of a small amount of metals of Periods 5 and 6 from Group VIII of the Periodic Table or rhenium. The metal or metals or compounds thereof so supplied is dispersed on the surfaces of porous catalyst in the inventory in a quantity usually less than about 20 parts per million of total catalyst inventory. A minimum value for effective metal to cause increased oxidation of CO in the dense bed may be less than 0.1 ppm and in some cases less than 0.02 ppm. Addition to the inventory of a minor amount of cracking catalyst to which has been added 5 ppm or less of platinum causes immediate, dramatic reduction of $\Delta T$, although the concentration of platinum in the total inventory may be too small for measurement by present analytical techniques. This has been clearly demonstrated in full scale commercial catalytic cracking units.

The immediate response of FCC Units to addition of platinum and the like in very small amounts is unique. Normally, the commercial units adapt very slowly to changes in operating parameters. With other catalysts it is usually a matter of weeks for a cracker to show effects of a catalyst change.

The form of the added metal or metals is not well understood. It can be expected that platinum and the other operative metals will undergo chemical change in the alternating conditions of reducing atmosphere with nitrogen, sulfur and other contaminants in the reactor and oxidizing atmosphere with contaminants in the regenerator. It is interesting to note that platinum catalyst used for reforming at temperatures equivalent to those for cracking cannot tolerate nitrogen and sulfur contaminants in significant concentration despite the massive excess of hydrogen there employed. In reforming, it is necessary to carefully purify the feed naphtha by hydrodesulfurization and hydrodenitrogenation to avoid poisoning the platinum catalyst.

It is presumed that coke deposited on the catalyst in the reactor will cover the platinum as well as the active acidic cracking sites and that the metal may not be fully available for oxidation of CO in the catalyst freshly introduced to the regenerator. The more active metal sites may be those on partially or fully regenerated catalyst recycled in the swirling fluidized dense bed at the bottom of the regenerator. If this is the case, the amount of effective metal at the port of spent catalyst introduction may be much less than the amount of metal calculated from the amount introduced to the catalyst. This uncertainty contributes to the impracticality of an attempt to determine the minimum amount. Calculated metal as low as 0.01 ppm appears to be effective, at least on a short term basis, though it may age to ineffectiveness in a relatively short time. There should be some metal applied as additive to at least a portion of the catalyst inventory. It will be detectable by an increase in dense bed temperature, but may not be susceptible of measurement by chemical analysis.

The maximum amount of metal or metals which can be used in the novel process of this invention is determined by economic considerations as well as technical considerations. Ideally, the least amount of catalyst necessary to convert the desired amounts of CO to $CO_2$ should be used since this ideal amount would have the least effect on the cracking cycle. However, amounts greater than the ideal can be tolerated up to the point where increased coke and hydrogen make become economically prohibitive.

Since the metal will age and so decline in activity, there is no clearly definable maximum numerical concentration of the platinum or other metal. As make-up catalyst containing platinum or other metal additive in fresh state is introduced to inventory, a corresponding amount of used catalyst is usually withdrawn. As a practical matter, the amount of metal (active and inactive) in the overall system should be held below 50 ppm as determined by analysis. Efficient operation is generally achieved at platinum levels below 10 ppm and this range is preferred. Maintenance of platinum level in active condition is accomplished by adding to inventory an amount of catalyst needed to maintain desired equilibrium cracking activity while withdrawing an equivalent amount of used catalyst. Some or all of the make-up catalyst will contain the desired metal additive in appropriate amount to sustain desired activity for oxidation of CO without appreciable effect on coke and hydrogen make. Good results have been obtained by using catalyst containing 5 ppm platinum as part of the make-up catalyst.

Although the novel process of this invention has been described with great particularity with respect to fluidized type reactors, it is to be understood that it is also applicable to units which use small size catalyst particles, such as 10 to 200 microns particle diameter, and have the cracking conducted primarily in the riser or transfer line. Similarly, the invention can be applied to more advanced regenerator designs in which at least part of the regeneration takes place in a riser, as contrasted to a backmixed dense bed. In fact, the additional heat generated by the catalyzed oxidation of CO can substantially improve riser regeneration performance.

It is to be understood that this invention is not limited to FCC units and fluid size, i.e., 10 to 200 microns particle diameter, catalyst particles. It is also applicable to moving bed-type reactors, such as TCC units, which use 4-8 Tyler mesh size catalyst particles. In fact, it has been found that utilizing the process of this invention can result in a substantially total elimination of carbon monoxide in the bottom zone of a two-zone TCC type regenerator.

One extraordinary aspect of the novel process of this invention is that it is applicable to all types of cracking units, and, in fact, it is also effective in those units which are designed to completely combust carbon monoxide by mechanical means. There exists in the market today, new designs for FCC units in which operate with conventional catalysts and conversion of CO is accomplished thermally rather than catalytically. However, in the actual operation of these units there are many problems, many of which have been eliminated through the use of the catalyst of this invention. When catalysts containing suitable low concentrations, usually well under 10 ppm total, of one or more metals chosen from Pt, Pd, Rh, Ru, Ir, Os and Re, many advantages become apparent in the operations of these units. The $\Delta T$ decreases; that is, the dense bed temperature increases and there is a sharp decrease in the dilute phase, cyclone and effluent gas temperature. More process heat is thereby retained by the dense bed for use in the reactor. With the increased dense bed temperature, a lower rate of catalyst circulation is required to supply the same amount of heat to the reactor. The reduced catalyst circulation results in less attrition and lower particulate emissions with the effluent regeneration gas, and may also reduce catalyst makeup requirements to maintain a given activity. With the higher dense bed temperature, the residual carbon on the catalyst returning to the reactor is reduced. It has been established that lower residual carbon will result in a higher effective catalyst activity. The lower catalyst circulation rate and the lower residual coke will improve selectivity, particularly by lowering yield of coke based on charge and a correponding increase in valuable liquid products. With the catalyst of this invention steam injection to lower high cyclone temperatures is unnecessary. Injection of torch oil to raise the temperature of the dense bed to sustain thermal conversion of CO is also unnecessary. Aside from the cost of the steam and torch oil, both of these controls accelerate the deactivation of the catalyst and make the process more difficult to control.

A further advantage to decreased catalyst circulation rate is less erosion of the intervals of the system. Although preheat of the feed to the cracking unit can also effect or allow a reduction in catalyst circulation rate, the efficiency of energy transfer in the form of heat to the reactor is greater when the heat is generated directly in the bed of catalyst.

In some fluid cracking units as well as in moving bed units, insufficient coke is deposited on the catalyst during the cracking cycle to generate enough heat when the coke is burned in the regenerator. In such cases, the temperature in the regenerator is too low to effectively reduce the residual carbon to a desirable level (e.g., below 0.2% wt. C). Furthermore, new, higher selectivity cracking catalysts, which produce more high-valued liquid products at the expense of coke cannot be used in these units, since they would be even more difficult to regenerate. With the catalyst of this invention sufficient additional heat is generated by oxidation of carbon monoxide to take advantage of any such improved selectivities.

The novel process of this invention is also applicable in those situations where it is not desired to completely eliminate all the carbon monoxide, but to effect only a partial reduction of the same. Thus, for example, the total elimination of carbon monoxide involves the evolution of additional heat and there are units which are operating today which cannot effectively use all the additional heat which would be provided by the total elimination of carbon monoxide, but still would operate more efficiently if the regeneration temperature was slightly increased. In a situation of this type, the novel process of this invention provides many benefits and the nature and extent of the benefits vary depending on the type of unit to which it is applied. Therefore, utilizing the process of this invention makes it possible to go from substantial conversion of carbon monoxide to almost total elimination of carbon monoxide, and yet have an effect on the cracking reaction to an extent that was impossible with the heretofore utilized oxidation catalysts.

In fact, in an actual commercial test in an existing FCC unit, which was not designed to completely combust all the carbon monoxide and which will be more fully described in the examples which follow, the novel process of this invention permitted the unit to be operated such that there was an actual increase in the amount of gasoline which was produced. This result is extraordinary since all the prior art processes which involved the addition of an oxidation promoter required a penalty to be paid with respect to gasoline make. The novel process of this invention, on the other hand, had the flexibility to permit controlled combustion of carbon monoxide in certain existing units so that it can permit an actual increase in the amount of valuable liquid products obtained. It is to be understood, of course, that even in those situations where the novel process of this invention is carried out so as to completely combust carbon monoxide, improved liquid product yields may be obtained or at the very least the penalty with respect to liquid products is substantially reduced.

As has heretofore been pointed out, the novel process of this invention is applicable to any and all types of cracking units, and as a practical matter, the amount of catalyst which is employed and its rate of addition to the unit can be easily ascertained.

It is well known in the petroleum cracking art that it is possible to determine the optimum dense bed temperature in a regenerator for any particular unit operating with a given catalyst and a given charge stock. As is also well known in the art, it is not possible in most cases to utilize the optimum dense bed temperature for the simple reason that engineering constraints with respect to metallurgy for most units dictate that temperatures must be maintained below certain maximums. It is also known that for each type of cracking unit, which is not designed to thermally convert substantially all of the carbon monoxide, existing metallurgy dictates that there is a point of weakness in the system which may be the maximum temperature of the cyclones, or the maximum temperature of the exhaust, or the maximum temperature of the dense bed, etc. In carrying out an actual operation according to the novel process of this invention, wherein less than substantially all carbon monoxide is to be combusted, all that is required is that the maximum dense bed temperature for the particular unit be determined and then that said dense bed temperature be monitored by a suitable temperature detecting means and the rate of addition of catalyst be controlled so as to maintain the temperature within the desired limits. As is known, change of one parameter in an existing cracking unit generally affects all other parameters, so that it is therefor possible to monitor one parameter and effectively control others. Quite obviously, monitoring of the dense bed temperature is but a convenient method of actually carrying out the novel process of this invention. It is to be understood that other parameters can be monitored if it is so desired, such as the flue gas temperature, etc.

In utilizing the process of this invention in those situations where it is desired to substantially oxidize all the carbon monoxide, a different set of governing principles is utilized. In units of this type, there are usually no metallurgical constraints, since the unit is designed to combust carbon monoxide and, therefore, its metallurgy is sufficient to withstand the higher temperatures. As has been pointed out, the use of the novel process of this invention in a unit of this type permits improved and enhanced results. One convenient method of employing the novel process of this invention when desiring to combust substantially all of the carbon monoxide is to monitor the flue gas for carbon monoxide content and to adjust the catalyst addition such that the minimum amount of catalyst is employed to combust carbon monoxide, thereby minimizing the undesirable effects on the cracking reaction.

As can be appreciated, it is difficult to talk about exact numerical values with respect to the metal concentration for the simple reason that the metal, e.g. platinum, becomes deactivated over a period of time so that a simple chemical analysis will not distinguish between the active metal and the deactivated metal. However, by merely monitoring the temperature as has been set forth, a very convenient control can be obtained on any given unit, thereby permitting it to be operated at its maximum advantage.

It is to be understood that the specific hydrogenation/dehydrogenation components need not be present in the form of the metal per se but obviously include compounds thereof, such as oxides, sulfides, etc.

The metal components or compounds thereof are of particular benefit in catalysts containing silica, alumina, magnesia, zirconia, clay and combinations thereof. They are found to be of particular benefit in a composite catalyst of active crystalline aluminosilicate zeolites in a porous matrix, such as a clay-derived matrix. Other types of matrices include silica, alumina, magnesia, zirconia, and mixtures of these. Catalysts of this type are known in the art and are disclosed in U.S. Pat. Nos. 3,140,249, 3,140,251, 3,140,252, 3,140,253, etc.

The metal component may be incorporated into the catalyst by impregnation, by ion exchange or by other means by contacting either the catalyst or a component thereof with a solution of a compound of the metal in an appropriate amount necessary to provide the desired concentration within the scope of the invention. The metal component may be incorporated either in any step during preparation of the catalyst or after the finished catalyst has been prepared. A preferred manner of incorporation is to ion-exchange a crystalline aluminosilicate and then compositing the ion-exchanged product with a porous matrix. Also useful is the ion-exchanging or impregnation of siliceous solids or clays. Suitable metal compounds include the metal halides, preferably chlorides, nitrates, ammine halides, oxides, sulfates, phosphates and other water-soluble inorganic salts; and also the metal carboxylates of from 1 to 5 carbon atoms, alcoholates. Specific examples include palladium chloride, chloroplatinic acid, ruthenium penta-ammine chloride, osmium chloride perrhenic acid, dioxobis (ethylenediamine) rhenium (V) chloride, rhodium chloride and the like. Alternatively, an oil-soluble or oil-dispersable compound of the metal may be added in suitable amount of a hydrocarbon feedstock, such as a gas oil charge stock, for incorporation in the catalyst as the charge is cracked. Such compounds include metal diketonates, carbonyls, metallocenes, olefin complexes of 2 to 20 carbons, acetylene complexes, alkyl or aryl phosphine complexes and carboxylates of 1 to 20 carbons. Specific examples of these are platinum acetylacetonate, tris (acetylacetonato) rhodium (III), triiodoiridium(III) tricarbonyl, $\pi$-cyclopentadienylrhenium(I) tricarbonyl, ruthenocene, $\pi$-cyclopentadienylosmium(I) dicarbonyl dimer, dichloro (ethylene) palladium(II) dimer, ($\pi$-cyclopentadienyl) (ethylene) rhodium (I), diphenylacetylenebis (triphenylphosphino) platinum (O), bromomethylbis (triethylphosphino) palladium (II), tetrakis (triphenylphosphino)palladium (O), chlorocarbonylbis(triphenylphosphino) iridium(I), palladium acetate, and palladium naphthenate.

Regardless of the method of incorporating the metal component in the catalyst, improved results have been obtained.

The feedstocks which may be cracked using the catalysts of this invention include any conventional hydrocarbon stocks, such as naphthas, gas oil, light and heavy distillates, residual oils and the like.

Again taking note of the previously made point that the present catalyst improvement is adapted to improvement of operation in existing catalytic cracking equipment representing many billions of dollars in capital investment, attention is again directed to Fluid cracking equipment of the heat balanced type. It is typical of most fluid regenerators that carbon is burned from the catalyst in a fluidized bed by air introduced at the bottom of the bed for the dual purpose of fluidizing the catalyst and of supplying oxygen for combustion of the coke deposit on the catalyst. Regenerator gas rising from above the bed carries with it some entrained catalyst. If the space above the bed is of about the same diameter as the bed, the concentration of catalyst therein, and hence density of the catalyst dispersion, is much lower than in the fluidized bed. If the gas rising from the bed is confined, it will have greater velocity and greater bulk density than in the case just discussed, but usually will be of less bulk density than the fluidized bed. For convenience, the art has come to refer to these two zones in the regenerator as "dense bed" in the fluidized portion and "dilute phase" thereabove. Those terms are so used here.

Burnig of coke in the dense bed is primarily a matter of kinetics in the absence of a CO oxidation promoter, yielding both CO and $CO_2$. To the extent that oxygen is present in the gas of the dilute phase, it will react with CO to yield $CO_2$, with generation of heat. The heat so released can be absorbed only by the gas present and by the catalyst dispersed therein. At low bulk density in the dilute phase, combustion of CO serves primarily to heat the gas of the dilute phase, possibly to temperatures in excess of those which can be tolerated by metals of the cyclones, plenum chamber, flues and other equipment at the top of the regenerator. This constraint on permissible flue gas temperature in a specific FCC unit may be satisfied by supplying less than the amount of air required for complete combustion of carbon to $CO_2$ or by injecting a quench medium to the top of the regenerator. Of the feasible quench media, steam is expensive and water risks thermal shock cracking of metal parts.

Since the degree of carbon combustion in the dense bed is a function of temperature, it is desirable to operate at the highest practicable dense bed temperature in order to return regenerated catalyst to the reactor at minimum values of coke on regenerated catalyst and hence, maximum cracking activity. However, the above-described constraints on flue gas and other temperatures in the regenerator leads to a compromise at lower dense bed temperatures and therefore, lower catalyst effectiveness.

The present invention affords to the refiner a way of easing that compromise by increasing the degree to which CO is burned in the dense bed, thus decreasing the temperature differential ($\Delta T$) between dense bed and dilute phase. This permits operation of the dense bed at a higher temperature without exceeding the metallurgical constraint on internals at the top of the regenerator. It is surprising that this is so, because the comparison against prior practices is a comparison against a system in which the catalyst contained potent catalyst for combustion of CO. Reference is made to the nickel and vanadium deposited on cracking catalyst from the gas oil feed stocks contaminated by those catalytic metals. It is normal practice to withdraw some catalyst from the Unit and replace it with fresh catalyst to hold the nickel and vanadium concentration to a level, e.g. a few hundred parts per million, which will affect cracking selectivity only to an extent which can be tolerated. According to this invention, a very small amount of a platinum group metal or rhenium causes a significant increase in regenerator dense bed temperature coupled with a reduction in regenerator $\Delta T$ without substantial adverse effect on the conversion level or gasoline selectivity in the reactor. It is even possible to increase conversion level and gasoline during cracking using a cracking catalyst promoted by a minute quantity of a platinum according to the invention. Unexpectedly, these values can go through a maximum as dense bed temperature is increased, due to operating characteristics and inherent constraints of a particular unit.

The unusual properties of these special catalysts are not restricted to operations at total CO conversion, as will be seen by review of operations in a commercial scale FCC Unit operating at a charge rate in excess of 40,000 barrels of fresh feed per day. The results will be set out with respect to a Unit having a "Swirl-type" regenerator, a typical form of which is shown in FIGS. 1 and 2 and for which the control scheme of two main control loops is shown in FIG. 3. It will be readily apparent that the results are also attainable in other types of regenerators such as that illustrated diagrammatically in FIG. 4.

Referring now to FIG. 1, a hydrocarbon feed 2 such as a gas oil boiling from about 600° F up to 1000° F is passed after preheating thereof to the bottom portion of riser 4 for admixture with hot regenerated catalyst introduced by standpipe 6 provided with flow control valve 8. A suspension of catalyst in hydrocarbon vapors at a temperature of at least about 950° F but more usually at least 1000° l F is thus formed in the lower portion of riser 4 for flow upwardly therethrough under hydrocarbon conversion conditions. The suspension initially formed in the riser may be retained during flow through the riser for a hydrocarbon residence time in the range of 1 to 20 seconds.

The hydrocarbon vapor-catalyst suspension formed in the riser reactor is passed upwardly through riser 4 under hydrocarbon conversion conditions of at least 900° F and more usually at least 1000° F before discharge into one or more cyclonic separation zones about the riser discharge, represented by cyclone separator 14. There may be a plurality of such cyclone separator combinations comprising first and second cyclonic separation means attached to or spaced apart from the riser discharge for separating catalyst particles from hydrocarbon vapors. Separated hydrocarbon vapors are passed from separator 14 to a plenum chamber 16 for withdrawal therefrom by conduit 18. These hydrocarbon vapors together with gasiform material separated by stripping gas as defined below are passed by conduit 18 to fractionation equipment not shown. Catalyst separated from hydrocarbon vapors in the cyclonic separation means is passed by diplegs represented by dipleg 20 to a dense fluid bed of separated catalyst 22 retained about an upper portion of riser conversion zone 4. Catalyst bed 22 is maintained as a downwardly moving fluid bed of catalyst counter-current to rising gasiform material. The catalyst passes downwardly through a stripping zone 24 immediately therebelow and counter-current to rising stripping gas introduced to a lower portion thereof by conduit 26. Baffles 28 are provided in the stripping zone to improve the stripping operation.

The catalyst is maintained in stripping zone 24 for a period of time sufficient to effect a higher temperature desorption of feed deposited compounds which are then carried overhead by the stripping gas. The stripping gas with desorbed hydrocarbons pass through one or more cyclonic separating means 32 wherein entrained catalyst fines are separated and returned to the catalyst bed 22 by dipleg 34. The hydrocarbon conversion zone comprising riser 4 may terminate in an upper enlarged portion of the catalyst collecting vessel with the commonly known bird cage discharge device or an open end "T" connection may be fastened to the riser discharge which is not directly connected to the cyclonic catalyst separation means. The cyclonic separation means may be spaced apart from the riser discharge so that an initial catalyst separation is effected by a change in velocity and direction of the discharged suspension so that vapors less encumbered with catalyst fines may then pass through one or more cyclonic separation means before passing to a product separaton step. In any of these arrangements gasiform materials comprising stripping gas hydrocarbon vapors and desorbed sulfur compounds are passed from the cyclonic separation means represented by separator 32 to a plenum chamber 16 for removal with hydrocarbon products of the cracking operation by conduit 18. Gasiform material comprising hydrocarbon vapors is passed by conduit 18 to a product fractionation step not shown. Hot stripped catalyst at an elevated temperature is withdrawn from a lower portion of the stripping zone by conduit 36 for transfer to a fluid bed of catalyst being regenerated in a catalyst regeneration zone. Flow control valve 36 is provided in transfer conduit 36.

This type of catalyst regeneration operation is referred to as a swirl type of catalyst regeneration due to the fact that the catalyst bed tends to rotate or circumferentially circulate about the vessel's vertical axis and this motion is promoted by the tangential spent catalyst inlet to the circulating catalyst bed. Thus, the tangentially introduced catalyst at an elevated temperature is further mixed with hot regenerated catalyst or catalyst undergoing regeneration at an elevated temperature and is caused to move in a circular or swirl pattern about the regenerator's vertical axis as it also moves generally downward to a catalyst withdrawal funnel 40 (sometimes called the "bathtub") adjacent the regeneration gas distributor grid. In this catalyst regeneration environment, it has been found that the regeneration gases comprising flue gas products of carbonaceous material combustion tend to move generally vertically upwardly through the generally horizontally moving circulating catalyst to cyclone separators positioned above the bed of catalyst in any given vertical segment. As shown by FIG. 2, the catalyst tangentially introduced to the regenerator by conduit 36 causes the catalyst to circulate in a clock-wise direction in this specific embodiment. As the bed of catalyst continues its circular motion more catalyst particles move from an upper portion of the mass of catalyst particles suspended in regeneration gas downwardly therethrough to a catalyst withdrawal funnel 40 in a segment of the vessel adjacent to the catalyst inlet segment. In the regeneration zone 42 housing a mass of the circulating suspended catalyst particles 44 in upflowing oxygen containing regeneration gas introduced to the lower portion thereof by conduit distributor means 46, the density of the mass of suspended catalyst particles may be varied by the volume of regeneration gas used in any given segment or segments of the distributor grid. Generally speaking, the circulating suspended mass of catalyst particles 44 undergoing regeneration with oxygen containing gas to remove carbonaceous deposits by burning will be retained as a suspended mass of swirling catalyst particles varying in density in the direction of catalyst flow and a much less dense phase of suspended catalyst particles 48 will exist thereabove to an upper portion of the regeneration zone. Under carefully selected relatively low regeneration gas velocity conditions, a rather distinct line of demarcation may be made to exist between a dense fluid bed of suspended catalyst particles and a more dispersed suspended phase (dilute phase) of catalyst thereabove. However, as the regeneration gas velocity conditions are increased there is less of a demarcation line and the suspended catalyst passes through regions of catalyst particle density generally less than about 30 lbs. per cu. ft. A lower catalyst bed density of at least 20 lb/cu. ft. is preferred.

A segmented regeneration gas distributor grid 50 positioned in the lower cross-sectional area of the regeneration vessel 42 is provided as shown in FIG. 1 and is adapted to control the flow of regeneration gas passed to any given vertical segment of the catalyst bed thereabove. In this arrangement, it has been found that even with the generally horizontally circulating mass of catalyst, the flow of regeneration gas is generally vertically upwardly through the mass of catalyst particles so that regeneration gas introduced to the catalyst bed by any given grid segment or portion thereof may be controlled by grid openings made available and the air flow rate thereto. Thus, oxygen containing combustion gases after contact with catalyst in the regeneration zone are separated from entrained catalyst particles by the cyclonic means provided and vertically spaced thereabove. The cyclone combinations diagrammatically represented in FIG. 1 are intended to correspond to that represented in FIG. 2. Catalyst particles separated from the flue gases passing through the cyclones are returned to the mass of catalyst therebelow by the plurality of provided catalyst diplegs.

As mentioned above, regenerated catalyst withdrawn by funnel 40 is conveyed by standpipe 6 to the hydrocarbon conversion riser 4.

The regenerator system shown in FIGS. 1 and 2 is designed for delivery of regenerator flue gas to a CO boiler (not shown) where the CO is burned with excess air to release heat to tubes for generation of steam. Flue gas from the dilute phase passes through two stages of cyclone separators to a plenum chamber 54 to conduit 52. Catalyst particles removed in the cyclones are returned to the dense bed 44 by diplegs 60, 62, 64 and 66.

As illustrated in FIG. 3, primary operating parameters are set by control loops responsive to flue gas temperature and reactor top temperature. Top temperature in the regenerator is maintained at a constant level which will avoid exceeding metallurgical limits. Temperature of the flue gas is compared against a set point at temperature controller 75 which operates a valve 76 to adjust the air supply to the regenerator. The flue gas temperature, in the absence of quenching at the top of the regenerator represents increase over dense bed temperature by the factor $\Delta T$ resulting from burning of CO in the dilute phase. As temperature in the flue 52 tends to rise, air supply is reduced, temperature in the dense bed drops, and the level of coke on regenerated catalyst rises. Necessarily, the level of conversion in the reactor drops.

The flow of regenerated catalyst to the reactor is controlled to maintain a desired top temperature in the reactor. That top temperature is a function of sensible heat of catalyst and feed stock reduced by the endothermic heat of reaction and of vaporization of the hydrocarbon feed. A rise in reactor top temperature, sensed by a suitable thermocouple, is compared at temperature controller 77 against a set point, which operates slide valve 8 to increase flow of regenerated catalyst for additional heat supply if reactor temperature drops or decrease catalyst flow when reactor temperature tends to rise. These controls are the major factors in achieving the "heat balances" principle of FCC operation. As will be seen, these automatic controls which are essential to the "rule of operation" of the unit, impose additional constraints on freedom of the operator to impose control on a single variable of the operation. For example, he can change the preheat of the charge, but only if accepts reduction in catalyst circulation rate when reactor temperature rises.

Similar constraints to achieve heat balance are characteristic of newer units designed for complete combustion of CO. One such design is illustrated in FIG. 4. The reactor and its control loop are similar to those of FIG. 3. The regenerator is characterized by a bottom chamber 78 in which a fluidized bed is maintained by air from line 46. A riser 79 carries regenerated catalyst upwardly from the dense bed under conditions conducive to oxidation of CO with consequent temperature rise to discharge at port 80. The flue gases pass through cyclones, not shown, to flue 52. A portion of the hot regenerated catalyst is stripped in stripper 81, to enter return line 6. Another portion of the hot catalyst is recycled to the dense bed in chamber 78 by line 82 for maintenance of dense bed temperature. Here the controller 75 which operates air valve 76 is responsive to analysis of flue gas for content of $O_2$, CO and the like. It will be immediately apparent that this system, like that of FIG. 3, imposes constraints on what the operator can do.

When promoted catalyst in accordance with this invention is added to a commercial unit, used in the real world, some striking effects are found. Bench scale tests indicate that platinum can be added to cracking catalyst in small amounts to promote CO oxidation with little or no impairment of cracking activity, measured as percent conversion of gas oil or selectivity to liquid products, e.g. gasoline. From this information, which itself renders these catalysts unique, it is to be assumed that commercial units would, at best, produce as much desired liquid product as the same catalyst without precious metal promoter. Surprisingly, proper adjustment of promote catalyst concentration and other parameters results in increased yields of desired liquid product. Such increase can go through a maximum, followed by decreased yields as severity of regenerator conditions continues to rise. Having obtained this result, it is capable of explanation on analysis of all observed data in the light of the constraints applicable to commerical equipment. As oxidation of CO takes place in the dense bed, rather than the dilute phase, with flue gas exit temperature within metallurgical limits; dense bed temperature increases with consequent decrease in carbon on regenerated catalyst. The catalyst of decreased carbon content has enhanced selectivity for yielding desired liquid products such as gasoline. It is also at a higher temperature than catalyst regenerated in the absence of the present promoter. Hence, as the dense bed temperature increases, the constraint imposed by the control loop responsive to reactor temperature acts to restrict flow through the slide valve 8 and the ratio of catalyst to oil feed drops, tending to reduction in conversion level in the reactor.

By balancing these two effects, namely reduced carbon on regenerated catalyst and increased regenerated catalyst temperature, the operator can achieve an important increase in liquid product yield by addition of the present promoter, even though the CO content of the flue gas is so high as to require a CO boiler or other supplementary CO combustion in order to satisfy emission standards.

The following examples illustrate the novel process of this invention.

EXAMPLE 1

215 cc of an aqueous Pd $(NO_3)_2$ solution containing 0.0103 g. Pd/liter were added to 222 g, bone dry basis, of a calcined RENaY containing 16.1 wt. % $RE_2O_3$ and 2.7 wt. % Na to 0.001 wt.% (10 ppm) Pd. The zeolite ws calcined at 1200° F. for 1 hour. The zeolite (10 wt.%) was incorporated in matrix (90 wt.%) consisting of 40 wt.% Georgia kaolin, 57.4 wt.% $SiO_2$, 0.6 wt.% $Al_2O_3$, and 2 wt.% $ZrO_2$ to provide 1 ppm palladium in the composite catalyst. The matrix was prepared by mixing water, kaolin, Q-brand sodium silicate (28.9 wt.% $SiO_2$, 8.9 wt.% $Na_2O$, and 62.2 wt.% $H_2O$), aluminum sulfate, sodium zirconium sulfate, and sulfuric acid. The mixture was spray dried and the catalyst was exchanged with an aqueous 5 wt.% $(NH_4)_2 SO_4$ solution, washed, and impregnated with an aqueous 7 wt.% $RECl_3.6H_2O$ solution. The catalyst was then dried in an oven at about 250° F and a portion of it was steamed for 4 hours at 1400° F. and 0 psig, the heating to 1400° F being carried out in a $N_2$ atmosphere.

EXAMPLE 2

215 cc of an aqueous $H_2PtCl_6$ solution containing 0.0103 g Pt/liter were added to another 222 g portion of the calcined RENaY of Example 1 to provide 10 ppm platinum. A catalyst was then prepared by the same procedure as in Example 1.

The cracking performances of the catalysts of Examples 1 and 2 were determined. A wide-cut Mid-Continent gas oil feedstock was cracked at 925° F. at a catalyst-to-oil ratio of 3 by wt. 8.3 WHSV, catalyst residence time 2.4 minutes; the results were:

| Catalyst (Example) | Ex. 1 | Ex. 2 | Blank* |
|---|---|---|---|
| Conversion, % vol. | 74.4 | 70.7 | 72.1 |
| $C_5$ + gasoline % vol | 65.0 | 63.0 | 64.3 |
| Total $C_4$'s, % vol. | 14.4 | 12.6 | 13.3 |
| Dry Gas, % wt. | 6.4 | 5.6 | 5.6 |
| Coke, % wt. | 2.5 | 2.3 | 2.3 |
| Carbon on Cat., % wt. | 0.71 | 0.65 | 0.65 |
| Hydrogen Factor** | 39 | 27 | 30 |

*Catalyst without added metal component.
**100 × [moles $H_2$/moles $C_1 + C_2$]

The two catalysts were subjected to regeneration in two successive stages. The conditions of each stage of regeneration were as follows: Air was passed over the catalyst at a rate of 25 cc/min./gram of catalyst at 1000° F. and atmospheric pressure for 8 minutes, and the gas was collected.

The results were as follows:

| First Stage | Ex. 1 | Ex. 2 | Blank* |
|---|---|---|---|
| $CO_2$, mol % | 3.5 | 5.2 | 4.0 |
| CO, mol % | 2.7 | 0 | 3.2 |
| $CO_2$/CO | 1.3 | ∞ | 1.3 |
| Initial Carbon, % wt. | 0.71 | 0.65 | — |
| Final Carbon, % wt. | 0.42 | 0.43 | — |
| Second Stage | Ex. 1 | Ex. 2 | Blank* |
| $CO_2$, mol % | 2.0 | 2.7 | 2.4 |
| CO, mol % | 1.2 | 0 | 1.7 |
| $CO_2$/CO | 1.7 | ∞ | 1.4 |
| Initial Carbon, % wt. | 0.42 | 0.43 | — |
| Final Carbon, % wt. | 0.28 | 0.26 | — |

*Catalyst without metal component

EXAMPLE 3

An RENaY (222 g) was prepared in the same manner as in Example 1, except that it was uncalcined. Thereafter, 163 cc of an aqueous $H_2PtCl_6$ solution containing 0.0137 g Pt/liter were added to provide 0.001 wt. % (10 ppm) platinum. A composite catalyst containing 1 ppm platinum was then prepared by the same procedure as in Example 1.

Cracking data, using the same feedstock as in the previous examples and under the same conditions, and regeneration data under the same conditions as in the previous examples were as follows:

| Catalyst | Ex. 3 | Blank |
|---|---|---|
| Conversion, % vol. | 76.2 | 74.4 |
| Coke, % wt. | 3.0 | 2.4 |
| Carbon on Cat., % wt. | 0.84 | 0.69 |
| Hydrogen Factor | 29 | 17 |
| Regeneration | Stage 1 | Stage 1 |
| $CO_2$, mol % | 8.3 | 3.3 |
| CO, mol % | 0.6 | 3.0 |
| $CO_2$/CO | 13 | 1.1 |
| Final C, % wt. | 0.56 | 0.56 |
|  | Stage 2 | Stage 2 |
| $CO_2$, mol % | 4.7 | 1.6 |
| CO, mol % | ≦0.1 | 1.4 |
| $CO_2$/CO | ≧47 | 1.1 |
| Final C, % wt. | 0.44 | — |

The increased $CO_2$CO mole ratio with the presence of only 1 ppm of platinum clearly illustrates the advantage of the metal component in the catalysts of this invention.

EXAMPLE 4

A rare-earth exchanged zeolite Y (15.8 wt. % $RE_2O_3$, 2.7% Na) was slurried with an aqueous solution containing $[Pt(NH_3)_6]Cl_4$. The resulting platinum-containing zeolite was filtered, dired at 250° F., and calcined at 1200° F. for one hour. The resulting zeolite was incorporated in a matrix as described in Example 1 to give a finished cracking catalyst containing 10% of the zeolite by weight to which 1 ppm platinum had been added. A blank catalyst was prepared similarly, the $[Pt(NH_3)_6]Cl_4$ being eliminated from the zeolite slurry.

Both catalysts were heated to 1400° F and steamed as in Example 1, used to crack the feedstock of Example 1 and regenerated under the conditions of Example 2. The results were as follows:

|  | Ex. 4 | Blank |
|---|---|---|
| Conversion, % vol. | 76.1 | 73.9 |
| Coke, % wt. | 2.8 | 2.5 |
| Carbon on Cat., % wt. | 0.82 | 0.73 |
| Hydrogen Factor | 19 | 16 |
| Regeneration | Stage 1 | Stage 1 |
| $CO_2$, % mol | 5.9 | 3.3 |
| CO, % mol | 0.15 | 1.7 |
| $CO_2$/CO | 39 | 1.9 |

EXAMPLE 5

A commercial cracking catalyst consisting of 15% REY and 85% matrix of 57.4% silica, 0.6% alumina, 40% clay and 2.0% zirconia, which had been spray dried, exchanged with ammonium nitrate and water-washed, was slurried with an aqueous solution of rare earth chloride and $Pt(NH_3)_4Cl_2$ sufficient to provide 3% $RE_2O_3$ and 2 ppm platinum to the finished catalyst. The catalyst was spray dried, heated in nitrogen, then steamed for 4 hours at 1400° F. A blank catalyst without platinum was prepared and treated similarly, $Pt(NH_3)_4Cl_2$ being omitted from the slurry.

Both catalysts were used to crack the same feedstock as in Example 2 and regenerated under the conditions of Example 2. The results were as follows:

|  | Ex. 5 | Blank |
|---|---|---|
| Conversion, % vol. | 79.5 | 78.8 |
| Coke, % wt. | 3.3 | 3.1 |
| Carbon on cat., % wt. | 0.945 | 0.884 |
| Hydrogen Factor | 15.8 | 12.1 |
| Regeneration | Stage 1 | Stage 1 |
| $CO_2$, mol % | 8.2 | 4.2 |
| CO, mol % | 1.2 | 3.4 |
| $CO_2$/CO | 6.8 | 1.2 |
|  | Stage 2 |  |
| $CO_2$, mol % | 5.7 |  |
| CO, mol % | 0.25 |  |
| $CO_2$/CO | 23 |  |

EXAMPLE 6

A number of metals of the platinum group and rhenium were used to treat a catalyst containing 15% REY silica-alumina-clay-zirconia matrix (similar to that of Example 5). Solutions of the metal salts of appropriate concentration were added to the catalyst until it was wet. The finished catalyst was dried at 250° F. for 24 hours, heated in nitrogen at 1400° F. over 3¼ hours and steamed for 4 hours. The metal salts were the chlorides of iridium, osmium and rhodium, and $[Ru(NH_3)_5Cl_2]Cl_2$ rhenium di(ethylene diamine) dioxide chloride, $Pt(NH_3)_4Cl_2$ and $Pd(NO_3)_2$. A total amount of metal equal to 3 ppm was so supplied. After the cracking of a wide-cut Mid-Continent gas oil feed and regeneration studies as in Example 2, the following results were obtained.

| Regeneration Stage 1 | Blank | Pt | Ir | Os | Pd | Rh | Ru | Re | Pt+Re* |
|---|---|---|---|---|---|---|---|---|---|
| $CO_2$, % mol | 3.8 | 7.1 | 5.7 | 4.2 | 4.6 | 4.9 | 4.5 | 3.8 | 4.6 |
| CO, % mol | 3.7 | 0.15 | 0.3 | 2.8 | 1.15 | 1.2 | 2.8 | 3.5 | 3.1 |
| $CO_2$/CO | 1.0 | 47 | 19 | 1.5 | 4.0 | 4.0 | 1.6 | 1.1 | 1.5 |

| Stage 2 | Blank | Pt | Ir | Os | Pd | Rh | Ru | Re | Pt+Re* |
|---|---|---|---|---|---|---|---|---|---|
| $CO_2$, % mol | — | — | — | 2.0 | — | 2.7 | 3.5 | 2.7 | — |
| CO, % mol | — | — | — | 1.65 | — | 0.7 | 1.0 | 1.4 | — |
| $CO_2$/CO | — | — | — | 1.2 | — | 3.9 | 3.5 | 1.9 | — |

*Made from $H_2PtCl_6$ and $HReO_4$ to provide 1.5 ppm of each metal.

EXAMPLE 7

In this example, equilibrium catalyst withdrawn from a commercial FCC unit was used. A wide-cut Mid-Continent gas oil stock was cracked at 929° F., 3 catalyst-oil ratio ratio, 2.4 minute catalyst residence time. The catalyst was regenerated in place in 2 stages under the conditions of Example 2. Then, the same gas oil, but now containing platinum acetylacetonate dissolved therein in sufficient quantity to provide 1 ppm platinum on the catalyst, was introduced into the cracker at the same conditions, except slightly higher temperature. The catalyst was regenerated again. Then the platinum-containing feed was again cracked over the same catalyst, and again the catalyst was regenerated. The following results were obtained:

| Cracking Feed | Gas Oil | Gas oil & Pt | Gas oil & Pt |
|---|---|---|---|
| Cycle | 1 | 2 | 3 |
| Temperature, °F. | 929 | 936 | 926 |
| Conversion, % vol. | 56.5 | 57.3 | 50.4 |
| Coke, % Wt. | 2.3 | 2.4 | 2.3 |
| Carbon on Cat., % wt. | 0.67 | 0.67 | 0.67 |
| Hydrogen Factor | 25 | 29 | 31 |
| Regeneration | Stage 1 | | |
| $CO_2$, % mol | 3.2 | 5.1 | 5.6 |
| CO, % mol | 2.7 | 0.18 | 0.10 |
| $CO_2$/CO | 1.2 | 28 | 56 |
| Estimated Pt on Catalyst at end of Cycle, ppm | 0 | 1 | 2 |

EXAMPLE 8

A commercial amorphous silica-alumina fluid cracking catalyst consisting of 13% $Al_2O_3$, 87% $SiO_2$ was impregnated with an aqueous solution of Pt $(NH_3)_4Cl_2$, oven-dried at 250° F, then heated and steamed at 1400° F as in Example 1. The amount of platinum compound supplied was equivalent to 3 ppm of the metal. The catalyst without metal addition (blank), similarly treated, and the platinum-containing catalyst were used in the fluid cracking of the Mid-Continent gas oil stock, and then regenerated under the conditions of Example 2. The results were as follows:

| Catalyst | Ex. 8 | Blank |
|---|---|---|
| Conversion, % vol. | 35.8 | 35.6 |
| Coke, % wt. | 1.82 | 1.54 |
| Carbon on Cat., % wt. | 0.52 | 0.44 |
| Regeneration | Stage 1 | |
| $CO_2$, % mol | 4.8 | 2.2 |
| CO, % mol | ≦ 0.05 | 1.2 |
| $CO_2$/CO | ≧96 | 1.8 |

EXAMPLE 9

Moving bed catalysts are also improved by the presence of the added metal component of this invention. (a) A blank catalyst was prepared by incorporating 7.5% of the calcined rare-earth exchanged zeolite Y of Example 4 and 40% alumina fines in a silica-alumina matrix (93.6% $SiO_2$, 6.4% $Al_2O_3$) by the bead technique described in U.S. Pat. No. 3,140,249. After base-exchange and washing, the hydrogel beads were dried in pure steam of atmospheric pressure at 270° F. for 15 minutes, then at 340° F. for 15 minutes. The dried catalyst was finished by a 14-hour steam treatment at 1290° F. with 100% steam at atmospheric pressure. This blank catalyst was used in static bed cracking of a Mid-Continent gas oil at 875° F., a liquid hourly space velocity of 3 and a catalyst/oil ratio of 2 with 10 minutes on stream. The spent catalyst was regenerated and the $CO_2$/CO ratio determined. (b) Rare-earth exchanged zeolite Y filter cake, 1530.6 g, containing 49.0% = 750 g of solids, was mulled with 160 cc of a $H_2PtCl_6$ solution containing 10.03 mg of Pt until uniform, then dried at 250° F. and calcined at 1200° F. for 3 hours. The product contained 13.4 ppm of platinum designed to provide 1 ppm of platinum to the catalyst after combination with the matrix. The preparation of the catalyst was completed as above. (c) The blank zeolite-matrix bead hydrogel was treated for 1 hour with sufficient $Pt(NH_3)_4Cl_2$ solution to supply 1 ppm of platinum based on the finished catalyst. (d) The calcined zeolite of paragraph (a) was used to prepare a catalyst similar to that described in (a) except that the matrix contained about 2200 ppm of cogelled $Cr_2O_3$.

These catalysts were also used in cracking the said feedstock at the same conditions, and were regenerated at the conditions of Example 2. The following results were obtained:

| Catalyst | (a) | (b) | (c) | (d) |
|---|---|---|---|---|
| Conversion, % vol. | 68.8 | 69.3 | 70.4 | 70.9 |
| Coke, % wt. | 2.9 | 3.2 | 3.1 | 3.2 |
| Regeneration | | | | |
| $CO_2$, % mol | 5.5 | 7.3 | 8.3 | 5.4 |
| CO, % mol | 4.8 | 0.4 | 0.2 | 5.0 |
| $CO_2$/CO | 1.1 | 18 | 42 | 1.1 |

EXAMPLE 10

A commercial clay-derived alumino-silicate zeolite cracking catalyst, containing about 55% by weight of alumina and about 45% by weight of silica and having an average particle size of between 58 and 64 microns, was employed in this example. A 1000 gram sample was mixed with 3500 cc of a solution containing 58.4 grams of $RECl_3.6H_2O$ and 2.7 mg of Pt as platinum tris (ethylene diamine) tetrachloride. After stirring for 30 minutes at 75° C. the catalyst was filtered out, water-washed and dried at 250° F. The catalyst contained 3 ppm platinum and 3% by weight of rare earth oxide. Another sample of the same clayderived catalyst ("Blank") was treated similarly, but without the platinum although with a slightly higher rare earth concentration present in the solution. The final catalyst contained 4.2% by weight of rare earth oxide. Both catalysts were steamed and tested for cracking performance as in Example 2.

A portion of each coked catalyst from the test was blended with uncoked steamed catalyst so that the carbon level of the mixture was 0.65% by weight. Regeneration was conducted at 1340° F. and atmospheric pressuring using 1.38 moles of oxygen per mole of carbon and the gas was collected. The following data were obtained:

| Regeneration | Ex. 10 | Blank |
|---|---|---|
| $CO_2$, % mol | 9.1 | 7.6 |
| CO, % mol | 0.3 | 3.6 |
| $CO_2$/CO | 30 | 2.1 |

EXAMPLE 11

The catalyst of Example 4, containing 1 ppm of platinum was calcined at 1200° F. in $N_2$ for 3 hours. A widecut Mid-Continent gas oil feedstock was cracked over this catalyst at 910° F. at a catalyst to oil ratio of 2.0 by weight, 12.5 WHSV and catalyst residence time of 2.4 minutes.

The coked catalyst from this run was blended in various concentrations with an equilibrium commercial zeolite catalyst withdrawn from a commercial FCC unit. This catalyst which contained no platinum had been regenerated and then used to crack the same gas oil feedstock as in Example 1 under the same conditions.

The variously blended coked catalysts were regenerated under the same conditions as in Example 2. The results were as follows:

| Pt-Containing Catalyst in Blend, % by wt. | Estimated Pt in Blend, ppm | $CO_2$ % mol | CO % mol | $CO_2/CO$ |
|---|---|---|---|---|
| 0 | 0 | 5.7 | 5.0 | 1.1 |
| 1 | 0.01 | 4.6 | 2.4 | 1.8 |
| 2 | 0.02 | 4.8 | 2.4 | 1.9 |
| 4 | 0.04 | 4.4 | 2.3 | 1.9 |
| 20 | 0.20 | 6.7 | 0.6 | 11 |
| 50 | 0.50 | 6.1 | 0.68 | 9.0 |
| 100 | 1.0 | 8.1 | 1.3 | 6.2 |

This experiment indicates that even at concentrations as low as 0.01 ppm of added metal component, the $CO_2/CO$ ratio is increased during regeneration.

The catalyst with added metal component may even contain an amount of metal component greater than that of the ultimate cracking catalyst mixture, such as, for example, but not necessarily, 100 ppm, provided that either in the use of the catalyst for cracking or in the regeneration of used catalyst it is blended with cracking catalyst containing less or no metal component at sufficient concentrations to reduce the total added metal component to a concentration below 100 ppm.

It may thus be seen from the results of the cracking operations and subsequent regeneration data that the catalysts of this invention are just as effective in hydrocarbon conversion as conventional cracking catalysts. However, in the regeneration step, the $CO_2/CO$ effluent ratios are extraordinarily higher than catalysts without the added metal component. The type of catalyst, feedstock or manner of introducing the new component does not destroy the effectiveness in regeneration efficiency.

EXAMPLE 12

This example demonstrates that Pt is an effective CO oxidative agent when it is incorporated in a hydrous composite of all the gel components prior to spray drying.

A cracking catalyst incorporating 5 ppm of Pt with 15% rare earth zeolite Y in a silica-alumina clay matrix (60% $SiO_2$-15% $Al_2O_3$-25% clay) was prepared as follows:

581.4 grams of WP grade Georgia kaolin were added to 45.2 lb (5.4 gallons) of deionized water and the whole was mixed thoroughly. 4167 grams Q-brand sodium silicate (1200 gms $SiO_2$) were added slowly to the water-clay slurry, such that the clay was uniformly dispersed and coated with the sodium silicate. The mixture was heated to 120° F and 216.1 ml concentrated (96.9%) sulfuric acid was added at a uniform rate over a period of 25 min. while mixing. The whole mixture was then held at 120° F for one hour while mixing, then allowed to cool to ambient temperature. A solution of 1744.2 grams aluminum sulfate (500 gms $Al_2O_3$) dissolved in 6977 ml deionized water was added slowly to the mixture while stirring. The resulting mixture, which had a pH of 3.3, was treated with 1150 ml of conc. ammonium hydroxide (29.8% $NH_3$) while stirring, in order to precipitate the alumina on the silica gel. The mixture was then acidified with 93 ml concentrated sulfuric acid (95.9%) to a pH of 4.6.

294.2 gms of REY (68% of the sodium content had been replaced with rare earth cations), which had previously been calcined at about 1200° F for about 10 min., were dispersed in 883 ml deionized water in a Waring blender (the REY had the following composition: $SiO_2$ = 57.9%; $Al_2O_3$ = 19.0% $RE_2O_3$ = 15.4%; $Na_2O$ = 3.6%). The zeolite slurry was added to the silica-alumina-clay mixture while mixing. The zeolite-matrix slurry was filtered on a Buchner funnel and the filter cake reslurried with deionized water to a total weight of 55 lbs, 230 gms aammonium sulfate added, and the whole mixture stirred for 30 minutes. The composite hydrogel was then washed by filtering, reslurrying the filter cake with deionized water to a total weight of 80 lbs and refiltering. This washing procedure was performed three times. After the final filtration, the filter cake was reslurried to a total weight of 51 lbs with deionized water; the pH of the final slurry was 4.5.

To the final slurry of the catalyst composite 5.7 mil of a solution containing 2 mg Pt/ml as Pt $(NH_3)_4Cl_2$ was added (a total of 11.4 mg Pt). The mixture was homogenized and spray dried (inlet gas to spray drier about 700° F and outlet gas about 350° F) to produce microspheres of from about 1 to 140 microns in diameter, with an average partical size of 79 microns. A sample of the product analyzed as follows: Na = 0.39%, $RE_2O_3$ = 1.82%, $Al_2O_3$ = 25.0%.

The catalyst was steam treated and tested for cracking activity and selectivity as previously described. The oxidation activity was determined by passing air (215°/min) through a fluidized bed of 10 gms of a blend of coked and uncoked steamed catalyst containing a total of 0.65% carbon at 1340° F. Analyses of the effluent gas for CO and $CO_2$ gave a $CO_2/CO$ ratio of 2.9, substantially higher than would be anticipated for the same catalyst without platinum.

EXAMPLES 13-18

Platinum was incorporated in fresh samples of commercial catalysts produced by the Filtrol Corporation. Filtrol 75-F, HS-7 and HS-10 were impregnated with aqueous solutions containing sufficient $[Pt(NH_3)_4]Cl_2$ to give 5 ppm Pt in the finished catalyst. The amount of solution used was just sufficient to fill the pores of the catalyst, so that Pt retention was quantitative. In an additional preparation, the impregnating solution contained both $[Pt(NH_3)_4]Cl_2$ and rare earth chloride hexahydrate sufficient to produce 5 ppm Pt and 3.0% $RE_2O_3$ in the finished catalyst. All the preparations were dried in air at 250° F, then mildly steam treated for 4 hours — 1400° F — 0 psig in 100% steam in a fluidized bed.

Cracking activity and selectivity were tested by cracking a wide-cut Mid-Continent gas oil over the steamed catalysts at 920° F, 3 C/O, 8.3 WHSV in a fixed fluidized bed. The results of these tests showed that the presence of Pt produced no significant effect on activity or selectivity; in particular, Pt had a negligible effect on hydrogen factor (see attached tables).

Oxidation activity was tested by blending the coked catalysts from the cracking test to 0.65% carbon with uncoked steamed catalysts, then passing a stream of air (215cc/min) through a fluidized bed of 2 gms of the blended coked catalyst at 1190° F. The effluent gas was analyzed for CO and $CO_2$, activity being measured by the $CO_2/CO$ ratio. The results (attached tables) show very high oxidation activities for the Pt-Containing catalysts.

| Effect of Platinum on Filtrol 75-F | | | |
|---|---|---|---|
| Example | 13 | 14 | 15 |
| | Base | Base + 5 ppm Pt | Base + 5 ppm Pt and 3% wt $RE_2O_3$ |

| | -continued | | |
|---|---|---|---|
| Treatment: Hours | 4.0 | 4.0 | 4.0 |
| : Temp., °F | 1400 | 1400 | 1400 |
| : % Steam | 100 | 100 | 100 |
| Conversion, % Vol | 80.3 | 76.1 | 79.9 |
| $C_5+$ Gasoline, % Vol | 66.7 | 63.5 | 66.1 |
| Total $C_4$, % Vol | 15.8 | 14.5 | 15.5 |
| Dry Gas, % Wt. | 7.0 | 6.3 | 6.9 |
| Coke, % Wt. | 3.57 | 3.88 | 3.91 |
| Hydrogen Factor | 30 | 39 | 36 |
| Recovery, % Wt | 96.5 | 97.0 | 96.7 |
| Oxidation Activity (1190° F, 2 gm Sample) | | | |
| $CO_2/CO$ | 0.9 | 83 | 150 |
| Relative $CO_2/CO$ | 1.0 | 92 | 167 |

Effect of Platinum on Filtrol HS-7 and HS-10

| Example | 16 | 17 | 18 |
|---|---|---|---|
| | HS-7 | HS-7 + 5 ppm Pt | HS-10 + 5 ppm Pt |
| Treatment: Hours | 4.0 | 4.0 | 4.0 |
| : Temp., °F | 1400 | 1400 | 1400 |
| : % Steam | 100 | 100 | 100 |
| Conversion, % Vol | 81.6 | 84.4 | 80.3 |
| $C_5+$ Gasoline, % Vol | 66.4 | 66.2 | 65.4 |
| Total $C_4$, % Vol | 18.9 | 18.5 | 17.1 |
| Dry Gas, % Wt | 7.8 | 8.1 | 7.4 |
| Coke, % Wt | 4.44 | 5.55 | 4.17 |
| Hydrogen Factor | 35 | 37 | 45 |
| Recovery, % Wt | 95.9 | 97.2 | 96.3 |
| Oxidation Activity (1190° F, 2 gm Sample) | | | |
| $CO_2/CO$ | 1.7 | 12 | 119 |
| Relative $CO_2/CO$ | 1.0 | 7 | 70 |

EXAMPLES 19-31

Following is the preparation of a fluid cracking catalyst which served as the base and for the preparation of the other examples of this series:

15% rare earth zeolite Y (REY) in silica-zirconia-alumina-clay matrix 57.4% $SiO_2$, 2% $ZrO_2$, 0.6 $Al_2O_3$, 40% clay.

1860.4 grams of WP grade Georgia kaolin were added to 86.4 pounds (10.3 gallons) of deionized water and the whole was mixed thoroughly. 7972.9 grams of Q-brand, sodium silicate (containing 2310 grams $SiO_2$) were added to the water-clay slurry. The sodium silicate was added slowly over a period of thirty minutes while mixing. The clay was uniformly dispersed and coated with sodium silicate. The whole was heated to 120° F and then 408.8 milliliters of aqueous sulfuric acid (97% wt $H_2SO_4$) were added at a uniform rate over a period of one hour while mixing. The whole was then held at 120° F for one hour. 139.5 grams of aluminum sulfate in 560 milliliters of deionized water were added at uniform rate over a ½ hour period while mixing. To 178 grams of TAM sodium zirconium silicate ($Na_2ZrSi-O_5$: 24-26% $Na_2O$; 46-49% Zr; 22-24% $SiO_2$) in 1730 milliliters deionized water were added 115 milliliters of sulfuric acid (97% wt $H_2SO_4$). This resulting slurry was then added to the clay-silicate gel at uniform rate over a ½ hour period while mixing. While agitating, additional sulfuric acid (97% wt $H_2SO_4$) was added over the next ½ hour to lower the pH to 4.5. 726.7 grams of REY (68% exchanged; i.e., 68% of the sodium content had been replaced with rare earth cations), which previously had been calcined at about 1200° F for about 10 minutes, were slurried by dispersion in a Waring blender in 2180 milliliters of deionized water. (The REY had the following composition: $Al_2O_3$ = 19.0%; $SiO_2$ = 57.9%; $(RE)_2O_3$ = 15.4%; $Na_2O$ = 3.6%.) This slurry was added to the foregoing silica-zirconia-alumina-clay slurry while mixing. The blend was homogenized and then spray dried (inlet gas to spray drier about 700° F and outlet gases about 350° F) to produce microspheres of from about 1 to 140 microns in diameter, with an average particle size of about 62 microns.

The spray dried particles were then slurried with deionized water, decanted, and exchanged in a column with 40 gallons of a 5% aqueous ammonium sulfate solution to remove sodium. Thereafter the particles were washed with the water until the effluent was free of sulfate ions. The product was then dried in an oven at 250° F.

A sample of the product analyzed as follows:

| | Wt percent |
|---|---|
| Na | 0.05 |
| $(RE)_2O_3$ | 1.95 |
| $NH_3$ | 0.64 |

Platinum-group metals were incorporated by impregnating the dried solid base catalyst with aqueous solutions containing the appropriate quantities of metal salts. The volume of impregnating solution was sufficient to just fill the pores of the catalyst, so that metal retention was quantitative. The particular salts were $[Pt(NH_3)_4]Cl_2$, $[Pd(NH_3)_4]Cl_2$, $[Ir(NH_3)_5Cl]Cl_2$, $[Rh(NH_3)_5Cl]cl_2$, $[Os(NH_3)_6]I_3$, and $[Ru(NH_3)_5Cl]Cl_2$.

Each catalyst was steamed in a fluidized bed for 4 hours at 1400° F at 0 psig with 100% steam, after being heated to 1400° F in a stream of nitrogen. The cracking activity and selectivity was tested by using the steamed catalysts to crack a wide-cut Mid-Continent gas oil (29.2° API) in a fixed fluidized bed at 920° F, 3 C/O, 8.3 WHSV. The oxidation activities were determined by blending the coked catalyst from the cracking test with fresh steamed catalyst to 0.65% wt carbon, passing a stream of air at 215 cc/min through a fluidized bed of 4 gms of the blend at 1240° F until all the carbon had been removed. The effluent gas was analyzed for CO and $CO_2$, the oxidation activity being represented as the $CO_2/CO$ ratio (mole/mole).

The catalysts prepared, along with the data derived from the cracking and oxidation tests, are given in the following tables.

The cracking activity and selectivity data show that addition of up to 10 ppm of any platinum group metal results in little or no decline in selectivity. Even at 50 ppm Pt, the hydrogen factor (100 × moles $H_2$/moles $C_1+C_2$), a sensitive measure of metal poisoning, has increased from 13 to only 40; many commercially acceptable cracking catalysts give similar hydrogen factors without an oxidation promoter.

Figure 6:
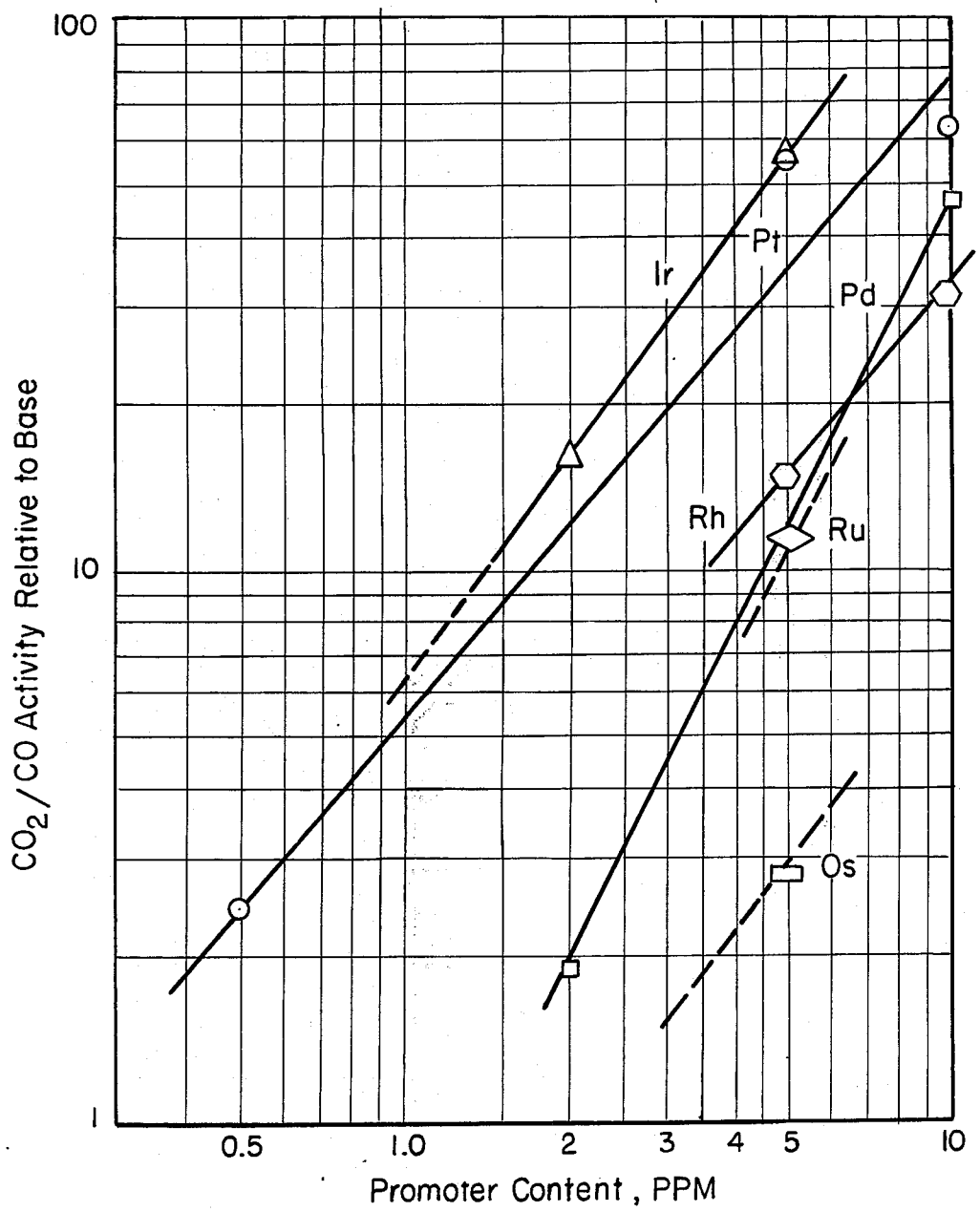
FIG. 6 shows the relative oxidation activity of promoter metals.

Each catalyst shows a significant oxidation activity, although the different metals have different activities. The activities are compared in FIG. 6 (log-log plot). The approximate relative activities are:

Ir ≧ Pt > Pd = Rh ≧ Ru > Os

| Example | 19 | 20 | 21 | 22 | 23 |
|---|---|---|---|---|---|
| Promoter | Base | Pt | Pt | Pt | Pt |
| Promoter Content, ppm | .0 | .5 | 5.0 | 10.0 | 50.0 |
| Cracking Test[1] | | | | | |
| Conversion, % Vol | 79.8 | 78.3 | 76.6 | 75.5 | 76.9 |
| $C_5+$ Gasoline, % Vol | 68.8 | 64.8 | 64.9 | 62.2 | 64.2 |
| Total Butanes, % Vol | 14.5 | 15.8 | 15.3 | 16.4 | 15.2 |
| Dry Gas, % wt | 6.7 | 7.0 | 6.5 | 6.8 | 6.6 |
| Coke, % Wt | 2.8 | 3.4 | 2.7 | 3.1 | 3.3 |
| Hydrogen Factor[2] | 13 | 17 | 22 | 26 | 40 |
| Oxidation Activity[3] | | | | | |
| $CO_2/CO$ at 1240° F | 0.77 | 1.8 | 43 | 49 | 1000 |
| Relative $CO_2/CO$ Activity | 1.0 | 2.4 | 56 | 64 | 1304 |
| Example | 24 | 25 | 26 | 27 | 28 |

-continued

| Promoter | Pd | Pd | Ir | Ir | Rh |
|---|---|---|---|---|---|
| Promoter Content, ppm | 2.0 | 10.0 | 2.0 | 5.0 | 5.0 |
| Cracking Test[1] | | | | | |
| Conversion, % Vol | 79.2 | 77.7 | 78.0 | 76.2 | 76.7 |
| $C_5+$ Gasoline, % Vol | 66.0 | 65.8 | 65.6 | 63.1 | 64.5 |
| Total Butanes, % Vol | 15.9 | 15.1 | 14.5 | 15.9 | 15.3 |
| Dry Gas, % Wt | 7.1 | 6.4 | 6.4 | 6.5 | 6.6 |
| Coke, % Wt | 3.0 | 2.7 | 3.3 | 3.3 | 2.8 |
| Hydrogen Factor[2] | 17 | 18 | 15 | 19 | 13 |
| Oxidation Activity[3] | | | | | |
| $CO_2/CO$ at 1240° F | 1.5 | 36 | 12 | 43 | 11 |
| Relative $CO_2/CO$ Activity | 1.9 | 47 | 16 | 57 | 15 |
| | | | | | |
| Example | 29 | 30 | 31 | | |
| Promoter | Rh | Os | Ru | | |
| Promoter Content, ppm | 10.0 | 5.0 | 5.0 | | |
| Cracking Test[1] | | | | | |
| Conversion, % Vol | 79.3 | 74.7 | 79.2 | | |
| $C_5+$ Gasoline, % Vol | 65.5 | 61.3 | 67.2 | | |
| Total Butanes, % Vol | 15.8 | 15.1 | 15.7 | | |
| Dry Gas, % Wt | 6.9 | 7.3 | 6.1 | | |
| Coke, % Wt | 3.4 | 2.7 | 2.8 | | |
| Hydrogen Factor[2] | 13 | 15 | 13 | | |
| Oxidation Activity[3] | | | | | |
| $CO_2/CO$ at 1240° F | 26 | 2.2 | 8.6 | | |
| Relative $CO_2/CO$ Activity | 34 | 2.8 | 11 | | |

[1] Fixed fluidized bed, WCMCGO, 8.3 WHSV, 3 C/O, 920° F
[2] Moles $H_2$/Moles $C_1+C_2 \times 100$
[3] 1240° F, 215 cc air/min, 4 g catalyst-coked catalyst from cracking test was blended with fresh steamed catalyst to give 0.65% wt C on total sample

EXAMPLES 32–45

Platinum — Group and Transition Metals Incorporated on Fresh DHZ-15

A commercial cracking catalyst, DHZ-15, manufactured by the Davison Chemical Division of W.R. Grace & Co., was impregnated with aqueous solutions of $Pt(HN_3)_4Cl_2$, $Cr(NO_3)_3 \cdot 6 H_2O$, $MnCl_2 \cdot 4H_2O$ and $Ni(NO_3) \cdot 4 H_2O$ to the levels listed in the following table. The impregnating solution volume was sufficient to just fill the pore of the catalyst, so that metal retention was quantitative. The catalysts were steam treated, tested for cracking activity and selectivity, and oxidation activity as described in Examples 19–31.

Incorporation of Pt to 1, 5 and 10 ppm shows very high oxidation activity; cracking activity and selectivity show no degradation.

At a Cr level of 10,000 ppm (1% wt Cr), a severe loss in activity and some loss in selectivity have occured, while only a minor increase in oxidation activity is observed, particularly in comparison to Pt (even at 1 ppm). A similar result is obtained with Mn, where substantially no oxidation activity is evident even at 10,000 ppm. Incorporation of Mn has, however, resulted in major losses in cracking activity.

Incorporation of nickel results in substantially no increase in oxidation activity, but results in serious losses in cracking selectivity, particularly with respect to increased coke yields and hydrogen factor.

TABLE

| Example | 32 | 33 | 34 | 35 | 36 |
|---|---|---|---|---|---|
| Promoter | Base | Pt | Pt | Pt | Pt |
| Promoter Content, ppm | .0 | .2 | .4 | .6 | 1.0 |
| Cracking Test | | | | | |
| Conversion, % Vol | 71.8 | 74.2 | 73.9 | 75.2 | 75.8 |
| $C_5+$ Gasoline, % Vol | 58.7 | 56.6 | 56.8 | 57.0 | 61.9 |
| Total Butanes, % Vol | 15.2 | 16.8 | 16.4 | 17.8 | 16.5 |
| Dry Gas, % Wt | 6.4 | 8.0 | 7.8 | 8.1 | 6.9 |
| Coke, % Wt | 3.2 | 4.4 | 4.3 | 4.6 | 3.3 |
| Hydrogen Factor | 26 | 22 | 22 | 23 | 27 |
| Oxidation Activity | | | | | |
| $CO_2/CO$ at 1240° F | 1.67 | 2.1 | 2.8 | 3.4 | 11 |
| Relative $CO_2/CO$ Activity | 1.0 | 1.3 | 1.67 | 2.1 | 6.7 |
| Example | 37 | 38 | 39 | 40 | 41 |

TABLE-continued

| Promoter | Pt | Pt | Cr | Cr | Cr |
|---|---|---|---|---|---|
| Promoter Content, ppm | 5.0 | 10.0 | 500 | 2,000 | 10,000 |
| Cracking Test | | | | | |
| Conversion, % Vol | 71.0 | 77.0 | 74.8 | 77.6 | 60.8 |
| $C_5+$ Gasoline, % Vol | 60.6 | 62.2 | 61.2 | 62.1 | 49.9 |
| Total Butanes, % Vol | 13.2 | 17.0 | 15.6 | 16.6 | 12.0 |
| Dry Gas, % Wt | 6.2 | 7.2 | 6.8 | 7.3 | 5.3 |
| Coke, % Wt | 3.0 | 3.4 | 3.3 | 3.6 | 3.0 |
| Hydrogen Factor | 23 | 30 | 23 | 21 | 23 |
| Oxidation Activity | | | | | |
| $CO_2/CO$ at 1240° F | 80 | 172 | 1.8 | 1.5 | 3.8 |
| Relative $CO_2/CO$ Activity | 48 | 103 | 1.1 | 0.9 | 2.3 |
| Example | 42 | 43 | 44 | 45 | |
| Promoter | Ni | Ni | Mn | Mn | |
| Promoter Content, ppm | 100 | 1,000 | 5,000 | 10,000 | |
| Cracking Test | | | | | |
| Conversion, % Vol | 73.9 | 76.5 | 67.4 | 56.4 | |
| $C_5+$ Gasoline, % Vol | 58.8 | 58.2 | 55.6 | 48.4 | |
| Total Butanes, % Vol | 15.5 | 16.5 | 13.4 | 10.5 | |
| Dry Gas, % Wt | 6.7 | 7.8 | 6.0 | 4.9 | |
| Coke, % Wt | 3.8 | 5.7 | 2.9 | 2.2 | |
| Hydrogen Factor | 45 | 142 | 23 | 23 | |
| Oxidation Activity | | | | | |
| $CO_2/Co$ at 1240° F | 2.0 | 1.9 | 0.9 | 1.8 | |
| Relative $CO_2/CO$ Activity | 1.2 | 1.1 | 0.5 | 1.1 | |

EXAMPLES 46 and 47

As has been stated, the oxidation promoters of this invention are very effective for substantially complete conversion of CO to $CO_2$ in FCC regenerators. But, they can also be used to advantage in applications where only partial conversion of CO is desired, as for example, in units which are temperature limited by their materials of construction. The substantial value of operating in a partial CO conversion mode is illustrated by these examples, which demonstrate the product yield benefits obtained in an active commercial test.

The test (Example 46) was made in an FCC unit of the Swirl regenerator type, corresponding to FIGS. 1, 2 and 3 of the Drawings, which had been operating with Pt promoted DHZ-15 catalyst manufactured by the Davison Division of W.R. Grace & Company. The test run (Example 46) was made, after adding as makeup 66.8 tons of DHZ-15 promoted with 0.14 ppm Pt for over a period of 8 days, followed by 39.6 tons of DHZ-15 promoted with 0.4 ppm Pt over the next 6 days, followed by 37.7 tons of DHZ-15 promoted with 0.6 ppm over the next 7 days, and 21.6 tons of DHZ-15 promoted with 0.8 ppm over the next 5 days. At this point, the amount of nickel in the total catalyst inventory was about 190 ppm and the amount of vanadium was about 240 ppm. Platinum was 0.14 ppm, by calculation.

A second test run (Example 47) was made in the same FCC unit after further addition of 42.2 tons of DHZ-15 promoted with 0.8 ppm Pt over a period of 7 days, followed by 21.3 tons of DHZ-15 promoted with 2 ppm Pt over the next 3 days. The platinum content was 0.31 ppm, by calculation.

Example 46 involves a low level of catalytic conversion of CO. Example 47 test, which was made when the unit contained catalyst with a higher level of oxidation activity as indicated by the $CO_2/CO$ ratio in the flue gas, showed a substantial increase in conversion, a reduction in coke yield, an increase in gasoline yield and a reduction in carbon on regenerated catalyst even though this unit was still operated with only partial catalytic conversion of CO.

The results are shown in the following table.

TABLE

| | | Example 46 | Example 47 |
|---|---|---|---|
| Fresh Feed Rate, B/D | | 42,000 | 42,300 |
| Coker in Feed, % Vol | | 23.9 | 24.7 |
| Fresh Feed Gravity, °API | | 22.5 | 22.8 |
| Reactor Temp., °F. | | 978 | 981 |
| Avg. Regenerator Dense Bed Temp. °F | | 1168 | 1228 |
| Carbon on Regen. Catalyst, % Wt. | | 0.36 | 0.17 |
| Flue Gas $CO_2$/CO Ratio | | 1.2 | 1.7 |
| Conversion, % vol F.F. | | 66.2 | 69.4 |
| Product Yields | | | |
| $C_2$ and Lighter, F.O.E./B. | | 0.064 | 0.070 |
| $C_3$ | % vol F.F. | 3.5 | 3.9 |
| $C_3=$ | " | 6.4 | 7.1 |
| $iC_4$ | " | 4.1 | 4.7 |
| $nC_4$ | " | 1.5 | 1.7 |
| $C_4$ | " | 7.5 | 7.9 |
| $C_5+$ Gasoline | " | 45.3 | 47.3 |
| Light cycle oil | " | 28.5 | 25.5 |
| Clarified Slurry oil | " | 5.3 | 5.1 |
| Coke, | % wt F.F. | 6.7 | 6.4 |

The incremental yield of gasoline of 2% obtained in Example 47, compared to Example 46, calculates a projected increase in production of about 15,000,000 gallons per year for this unit alone. The unit could not have been operated to obtain these benefits without the use of the catalyst of this invention.

It will also be seen that addition of platinum promoted catalyst to a system which already contained CO promoter (Ni, V) did not, as might be expected, result in loss of liquid yield until the catalyst circulation was so far reduced that catalyst to oil ratio became controlling and caused loss of gasoline production. These effects are dramatically illustrated by the graphs of FIG. 5, showing clearly defined maxima in conversion and gasoline yield as $CO_2$/CO values are reduced.

What is claimed is:

1. A process for raising the temperature of a dense bed in the regenerator of a catalytic cracking unit to a predetermined level, said unit comprising a cracking section operating in the absence of added hydrogen and a regenerating section in which CO is combusted in the dilute phase, which unit contains a circulating inventory of solid acidic cracking catalyst; the improvement which comprises:
   a. circulating with said catalyst 0.01 to 50 ppm, based on total catalyst inventory, of at least one metal of the group consisting of platinum, palladium, iridium, osmium, rhodium, ruthenium, and rhenium;
   b. and causing CO to combust in said dense bed;
   c. thereby raising the dense bed temperature to said predetermined level; and
   d. maintaining the dense bed temperature at its predetermined level by monitoring the temperature thereof and adding more of said metal when the temperature falls below a set limit.

2. The process of claim 1, wherein the metal added is platinum.

3. The process of claim 2, wherein said cracking unit contains a crystalline aluminosilicate zeolite of the faujasite variety.

* * * * *